(12) United States Patent
Snyder, II

(10) Patent No.: US 6,189,083 B1
(45) Date of Patent: Feb. 13, 2001

(54) METHOD AND APPARATUS FOR ACCESSING A CACHE MEMORY UTILIZATION DISTINGUSHING BIT RAMS

(75) Inventor: Wilson Parkhurst Snyder, II, Hudson, MA (US)

(73) Assignee: Compaq Computer Corporation, Houston, TX (US)

( * ) Notice: Under 35 U.S.C. 154(b), the term of this patent shall be extended for 0 days.

(21) Appl. No.: 09/030,797

(22) Filed: Feb. 26, 1998

(51) Int. Cl.$^7$ .................................................... G06F 9/26
(52) U.S. Cl. ............................................................. 711/213
(58) Field of Search ........................... 711/213–220, 117, 711/118, 137, 218, 219; 712/224, 240

(56) References Cited

U.S. PATENT DOCUMENTS

| | | | |
|---|---|---|---|
| 4,894,772 | * 1/1990 | Langendorf | 712/240 |
| 5,509,135 | * 4/1996 | Steely, Jr. | 711/147 |
| 5,966,737 | * 10/1999 | Steely, Jr. et al. | 711/213 |

* cited by examiner

Primary Examiner—Do Hyun Yoo
Assistant Examiner—Than Nguyen
(74) Attorney, Agent, or Firm—Williams, Morgan & Amerson, P.C.

(57) ABSTRACT

A prediction mechanism is provided for determining a bank of a secondary cache and a tag sub-store corresponding to a data element requested by a central processing unit.

The mechanism employs a bit number select logic for determining unique bit number locations of differences between selected tag sub-store values. Those unique bit number locations are based upon the values of the tag sub-stores at previously determined difference locations. The bit number locations, and the values of the tag sub-stores at those bit number locations, are stored in a distinguishing bit RAM.

When a main memory access is initiated, the values of the tag sub-stores at those bit number locations are compared with corresponding values of the tag portion of the main memory address. When that comparison indicates that selected ones of the tag sub-store values are equivalent to the corresponding values of the tag portion of the main memory address, an associated bank of the secondary cache is accessed.

20 Claims, 17 Drawing Sheets

METHOD AND APPARATUS FOR ACCESSING A CACHE MEMORY UTILIZATION DISTINGUSHING BIT RAMS

BACKGROUND OF THE INVENTION

This invention relates generally to computer systems and more specifically to the management of cache memory in a computer system. As it is known in the art, computer processing systems include a central processing unit which operates on data stored in a main memory. Increased computer processing performance is often achieved by including a smaller, faster memory called a cache, between the central processing unit and the main memory for temporary storage of data. The cache reduces the delay or latency associated with memory access by storing subsets of the main memory data that can be quickly read from the cache and modified by the central processing unit.

Because computer processes commonly reference main memory data in contiguous address space, data is generally obtained from main memory and stored in cache in blocks. There are a variety of methods used to map blocks of data from main memory into the cache. Two typical cache arrangements include direct mapped caches and set associative caches.

In a conventional direct mapped cache, a block of data from memory is mapped into the cache using the lower bits of the memory address. The lower bits of the memory address are generally called the cache index. The upper bits of the memory address of the data block are generally called the 'tag' of that block. A tag store, which generally has a number of locations equivalent to the number of blocks in the cache, is used to store the tag of each block of data in the cache.

When a processor requires data from the cache it uses the associated address for accessing the tag store and compares the received tag to the upper bits of the memory address of the required data. If the data is not in the cache, the tag does not match the upper address bits and there is a "cache miss" occurrence. When there is a cache miss, a main memory read is performed to fill the cache with the required data. It is desirable to minimize the number of cache misses in order to avoid the latency incurred by the resulting memory reference.

Direct mapped caches are advantageous because they provide a cache system with minimal complexity. Also, because the addressing scheme is straightforward, the cache is able to quickly return data to the central processing unit. However, one drawback of direct mapped caches is that since there is only one possible location in the cache for numerous blocks of data having a common cache index, the miss rate is generally high. Thus, although direct mapped caches are able to quickly return data to the central processing unit, the performance is greatly reduced by the high miss rates inherent in the system.

Set associative caches serve to reduce the amount of misses by providing multiple cache locations for memory data having a common cache index. In set-associative caching, the cache is subdivided into a plurality of 'sets'. Each set has an associated tag store for storing the tags of the blocks of data stored in the set. As in direct mapped caching, the location of a particular item within the cache is identified by a cache index derived from the lower bits of the memory address.

When the processor wants to fetch data from the cache, the cache index is used to address each of the sets and their associated tag stores. Each set outputs a data item located at the cache index to a large multiplexer. The associated tags are each compared against the upper bits of the main memory address to determine if any data item provided by the sets is the required data item. Assuming that the data item to be fetched is in one of the sets of the cache, the tag output by the tag store associated with that set will match the upper bits of the memory address. The multiplexer passes the data corresponding to the matched tag to the processor.

Set-associative cache mapping thus provides improved performance over a direct mapped cache by reducing the frequency of cache misses. However, the amount of time required to perform the set comparison makes the set-associative cache memory system a relatively slow system.

Computer systems typically implement either a direct mapped or set associative cache memory. Some prior art computer systems, however, have included a cache memory having the advantages of both set associative and direct mapped caches. Such caches use a RAM device to aid in the selection of an appropriate cache set containing a required data element. However these devices use a significant amount of semiconductor real estate and are limited to caches having a small number of sets.

It is therefore desirable to provide the same cache selection functionality using a smaller amount of semiconductor real estate and also allow the functionality to be scaleable for caches having large numbers of sets.

SUMMARY OF THE INVENTION

The invention resides in encoding tag addresses stored in a tag store such that a smaller representation of differences between each of selected ones of those tag addresses are stored in an associated memory, thus reducing the amount of integrated circuit area that memory requires. Further, the invention resides in a method and apparatus for determining the differences between each of the tag addresses and for comparing those differences to an encoded version of a tag address associated with a required data element such that one of many cache sets in a cache memory can be quickly selected and accessed.

One or more distinguishing bit RAMs store differences between encoded representations of tag addresses stored in an associated tag store. A comparison is performed between a selected difference value and the corresponding value of the encoded version of a tag address for a requested data element.

With such an arrangement, the distinguishing bit RAM(s) store smaller amounts of data thereby requiring smaller amounts of semiconductor real estate. Further, using a plurality of distinguishing bit RAMs allows the design to be scaleable for caches including large numbers of sets.

BRIEF DESCRIPTION OF THE DRAWINGS

The above-mentioned and other features of the invention will now become more apparent by reference to the following description taken in connection with the accompanying drawings in which.

DESCRIPTION OF THE PREFERRED EMBODIMENT

The disclosure of commonly owned U.S. Pat. No. 5,966,737 entitled "Apparatus and Method for Serialized Set Prediction", which was assigned to Digital Equipment Corporation of Maynard, Mass., and is now assigned to Compaq Computer Corp. of Houston, Tex., is hereby incorporated by reference.

Figure 1:
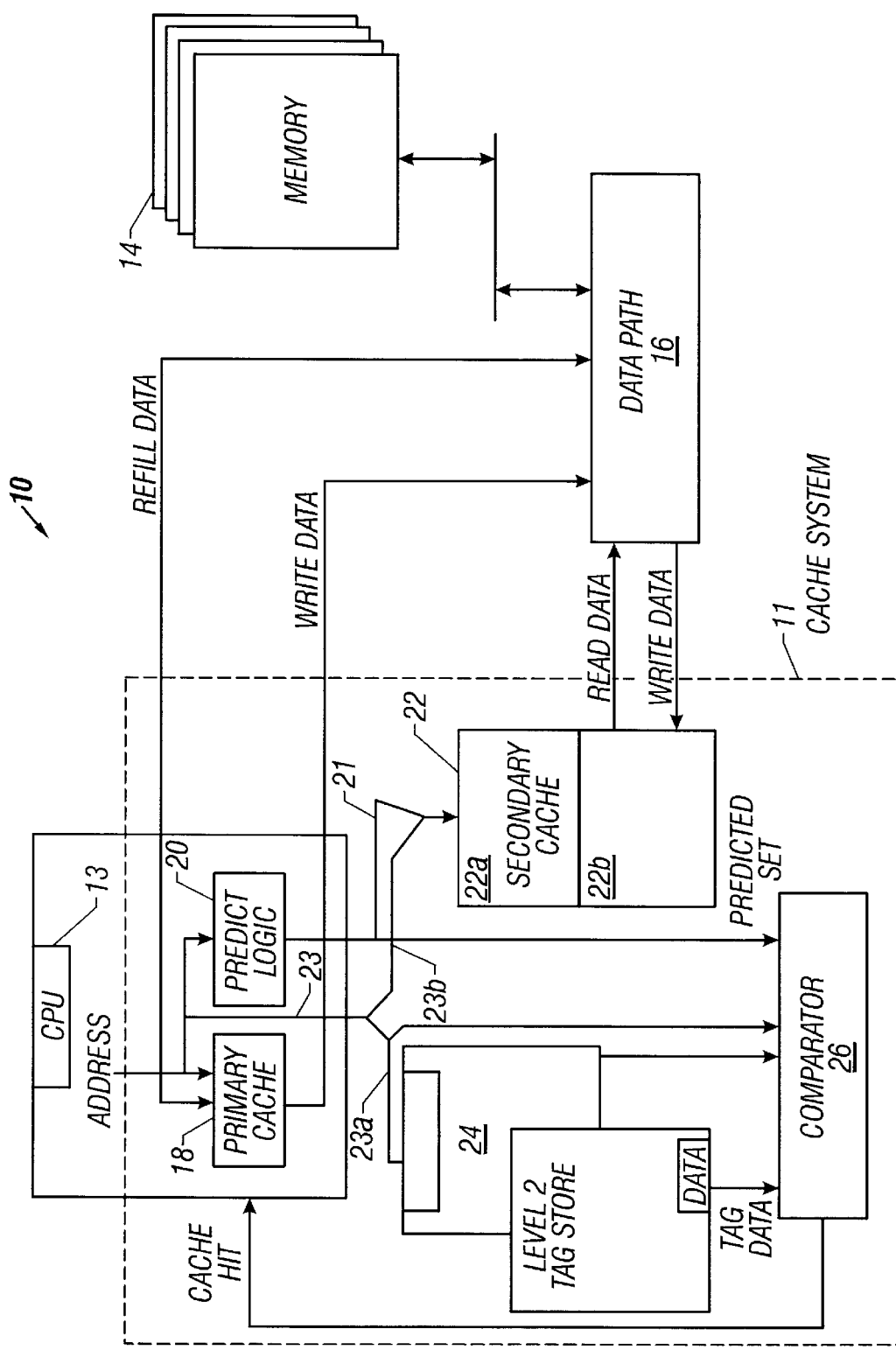
FIG. 1 illustrates a computer system including a cache memory system having prediction logic in accordance with an embodiment of the invention.

Referring now to FIG. 1, a computer system 10 is shown to include a central processing system 12 including a central processing unit (CPU) 13 for processing an instruction stream and a cache memory system 11. A memory 14 stores instructions and data which are transferred via a data path 16 to the CPU 13 during the execution of the instruction stream. The central processing system 12 includes a primary cache 18 which is a small, fast cache for temporary storage of data from memory 14. The central processing system 12 also includes prediction logic 20 for assisting in a determination of the location of required data as will be described.

The central processing system 12 is coupled to a secondary cache 22 and a corresponding tag store 24. The secondary cache 22 is relatively larger and slower than the primary cache 18, yet smaller and faster than the memory 14. For illustration purposes, the secondary cache 22 is a direct-mapped cache which stores a plurality of blocks of data from memory. The secondary cache 22 is here shown apportioned into two portions, referred to as pseudo banks(22a and 22b), each having the same number of blocks, although any number of pseudo banks could be used.

Tag store 24 has a number of locations corresponding to the number of blocks in the secondary cache 22. Tag store 24 is shown to be partitioned into a plurality of portions referred to as sub-stores corresponding to the plurality of pseudo banks of the secondary cache 22. Each location of the tag store 24 stores the upper bits of the memory address of the block at the corresponding pseudo bank cache location.

During operation of the computer system, blocks of data and instructions are transferred from memory 14 into the secondary cache 22. When the CPU 13 requires data, it provides an address on line 23. The address has an upper address portion on line 23a and a lower address portion on line 23b. The lower portion of the memory address is referred to as the cache index, and is used to access the secondary cache 22. The upper portion of the address on line 23a is referred to as the tag address or 'tag' of the data, and is used in conjunction with the tags stored in tag store 24 to verify that the correct data is retrieved from the secondary cache 22.

When data is written to a newly allocated location in a pseudo bank of the secondary cache 22, for example during a cache refill operation, the tag on line 23a is written to the corresponding sub-store location of the tag store 24. When a data item is read from a location in a pseudo bank of the secondary cache 22, the tag on line 23a is compared by comparator 26 against the tag stored in the corresponding sub-store location in the tag store 24 to determine if the data received from the cache is the required data.

The secondary cache 22 is typically designed as a direct-mapped cache. However, the drawback of a direct-mapped cache is that there is only one available cache location for mapping a plurality of memory locations having the same cache index. By dividing the direct-mapped secondary cache 22 into a number of pseudo banks, the number of available cache locations for storing memory data items having a common cache index is directly proportional to the number of available pseudo banks. Thus there is more than one location in which data items having a common cache index may be stored. When a data item is required from the secondary cache 22, each of the potential locations are searched to find that data. Performing such multiple searches on the secondary cache, however, serves to decrease the performance of the computer system by increasing the latency associated with obtaining data from the secondary cache.

1. Generation of a prediction index using distinguishing bit RAMs.

The central processing system 12 includes a prediction unit 20 which provides a prediction index on line 21. The prediction index alleviates the performance loss due to multiple searches by insuring that the first cache location probed is the cache location which contains the required data, as will be described below.

Figure 2:
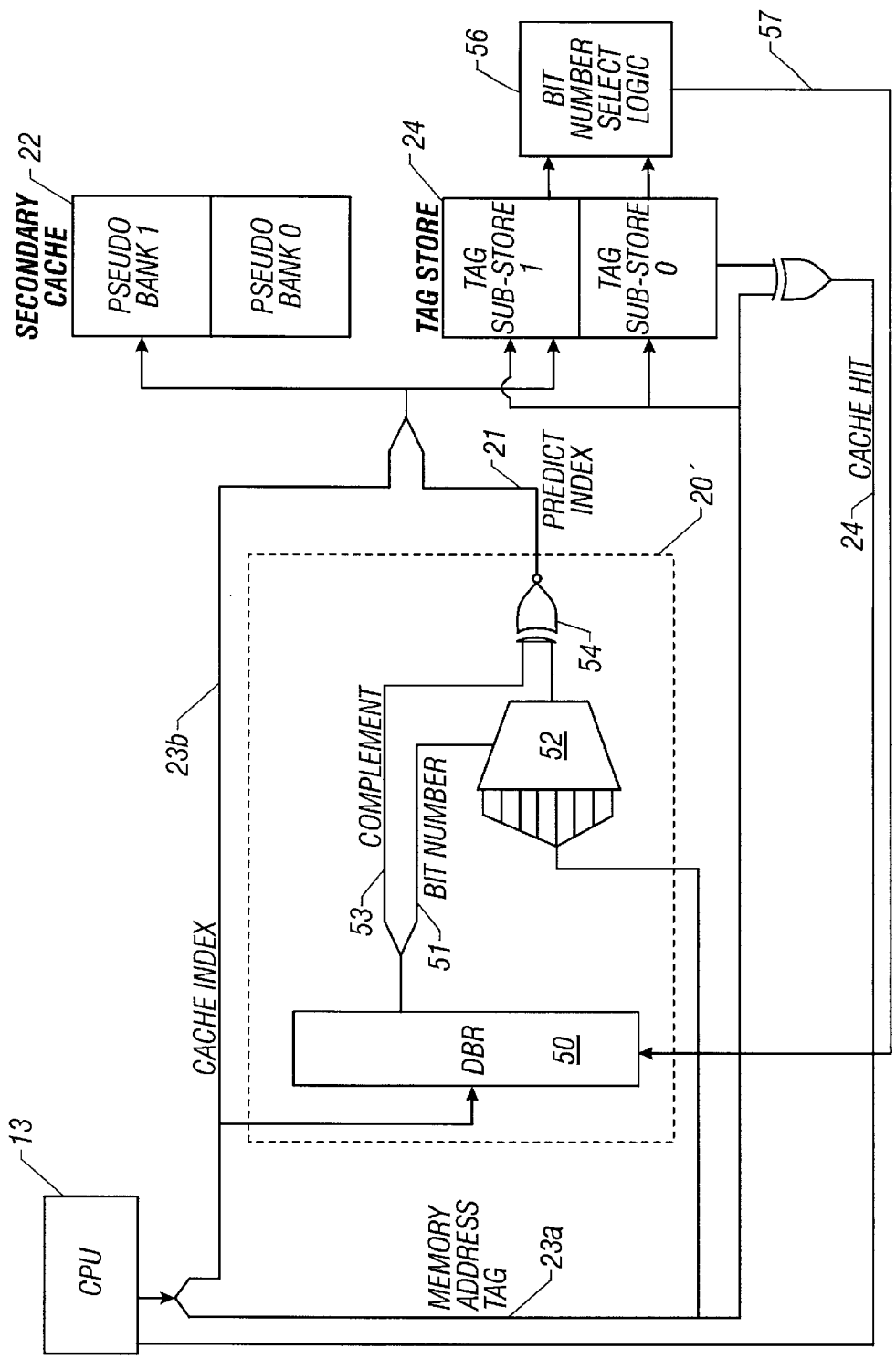
FIG. 2 illustrates one embodiment of the prediction logic incorporated in the cache sub-system of FIG. 1.

Referring now to FIG. 2, an embodiment of the prediction logic 20' is shown to include a storage device, referred to as a distinguishing bit RAM (DBR) 50, coupled to a control input of multiplexer 52 to provide a bit number on line 51. The DBR 50 also provides a complement signal on line 53 to exclusive-or (XOR) gate 54 which, in turn, provides a prediction index on line 21 for accessing the secondary cache 22. Also coupled to DBR 50 is a bit number select logic 56 which provides each bit number to be stored in the DBR in a manner which will be described below. It should be noted that this embodiment is most effective in, but is not limited to, an arrangement where there are two pseudo banks in the secondary cache 22, for example pseudo bank 0 and pseudo bank 1. Accordingly, the tag store 24 is subdivided such that there is a separate sub-store corresponding to each pseudo bank of the secondary cache 22, for example tag sub-store 0 and tag sub-store 1.

The distinguishing bit RAM (DBR) 50 stores a plurality of bit numbers, each corresponding to a location of each tag sub-store. The bit number stored in the DBR 50 is any bit number at which a tag in the sub-store corresponding to pseudo bank 0 (tag sub-store 0) differs from the tag in the corresponding location of the sub-store corresponding to the pseudo bank 1 (tag sub-store 1). The bit numbers are determined for each location in each tag sub-store by the bit number select logic 56 during the operation of storing data in the secondary cache 22. In other words, when a data element is stored in the secondary cache 22, its tag is stored in one of the tag sub-stores and a difference operation is performed by bit number select logic 56. The difference operation determines the bit numbers of bit-wise differences between each tag stored in corresponding locations of different tag sub-stores. For example, when a tag element is stored in tag substore 0, bit number select logic determines the differences between it and the tag stored in the corresponding location of tag sub-store 1. If more sub-stores were implemented, bit number select logic 56 would determine every difference as between every tag stored in a corresponding location of the other tag sub-stores.

A value, referred to as a "complement" value, is stored along with each distinguishing bit number in the distinguishing bit RAM 50. The complement value is used to indicate whether or not the value of the tag, at the bit number identified by the DBR 50, is directly related to the pseudo bank number.

For example, consider a cache sub-system having two tag sub-stores, each including a plurality of four-bit tags. The binary value of one of the tags in the sub-store corresponding to pseudo bank 0 is 1110 and the binary value of the corresponding tag in the sub-store corresponding to pseudo bank 1 is 1000. Also, the cache sub-system executes a selection algorithm which compares the two tags and identifies the bit number of the least significant bit which differs between the two tags. Accordingly, the distinguishing bit number of the two tags described above is identified as bit number 1 because that is the least significant bit which differs between the first tag, 1110, and the second tag, 1000. The value of the bit at bit number 1 is logical '1' for the tag corresponding to pseudo bank 0 and logical '0' for the tag corresponding to pseudo bank 1. Therefore, the value of the tag at the distinguishing bit number cannot alone be used as the prediction index to be appended to the cache index, since an incorrect pseudo bank would be selected. Thus a complement value of '1' is stored when the value of the bit at the bit number is inversely related to the pseudo bank number. Consequently a complement value of 0' is stored when the value of the bit at the bit number is directly related to the pseudo bank number.

Upon initiation of each access of secondary cache 22, the DBR 50 provides the differing bit number on line 51 and the corresponding complement value on line 53. The bit number is used to select one of the bits of the memory address tag on line 23a via multiplexer 52. The selected memory address tag bit is then inverted in response to the complement signal on line 53 by exclusive-or gate 54 to provide the prediction index on line 21.

The above described arrangement has the advantage that the desired location in the secondary cache is always accessed on the first probe. This is apparent since the tag bit of the other pseudo bank does not equal the corresponding bit of the memory address tag. Therefore, if the data is in the secondary cache 22, it will be found on the first probe.

However, because in the present embodiment only two pseudo banks of data are provided, the potential exists that the required data is not in the secondary cache, thereby resulting in a cache miss. In such an event, the memory data is fetched from memory 14 (FIG. 1) while the memory address tag on line 23a is written to one of the tag sub-store locations. Deciding which sub-store location (and, correspondingly, which pseudo bank) to store the memory data in, may be performed by either a least recently used algorithm or other algorithms well known to one of skill in the art.

During the access of memory 14, the memory tag, newly stored in the selected tag sub-store, is compared against the existing tag in the corresponding location of the other sub-store by the bit number select logic 56. The bit number select logic 56 selects a bit number at which the two tags differ, and determines whether or not the bit value of the tag is directly or indirectly related to the pseudo bank number of the tags. The bit number and the complement value are provided on line 57 to the DBR 50 and written to the location corresponding to the cache index provided on line 23b.

The above described distinguishing bit RAM embodiment of the invention thus provides an efficient mechanism by which a direct-mapped secondary cache may have set-associative attributes without the increased hardware complexity and timing delays normally associated with set-associative caches.

2. Generation of a prediction index using distinguishing bit RAMs and encoding logic.

Figure 3:
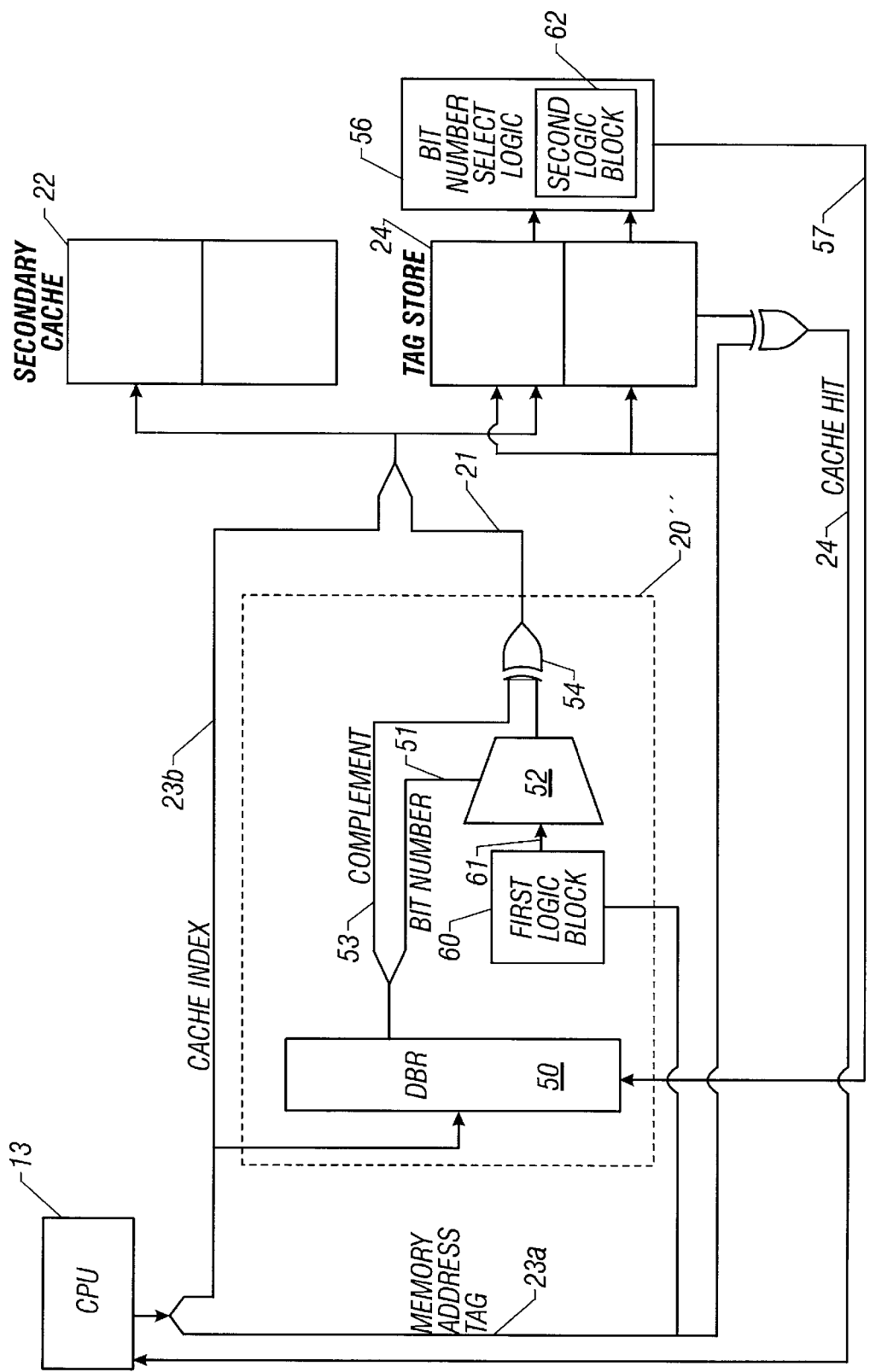
FIG. 3 depicts a further embodiment of the prediction logic of FIG. 1 including encoding logic.

Referring now to FIG. 3, an alternative embodiment of the prediction logic 20" is shown to include a distinguishing bit RAM 50 for providing a bit number select on line 51, to multiplexer 52 and a complement signal on line 53 to exclusive-or gate 54. As previously discussed, exclusive-or gate 54 provides a one-bit prediction index on line 21 for accessing the secondary cache 22 and the tag store 24. Prediction logic 20" further includes a first logic block 60 having exclusive-or logic for generating an encoded version of the memory address tag on line 23a. The encoded version of the memory address tag is output from the first logic block 60 on line 61 which is coupled to the data input of multiplexer 52.

Bit number select logic 56, also includes a second logic block 62. Second logic block 62 includes exclusive-or logic that is functionally equivalent to first logic block 60. In other words, second logic block 62 can include logic having a configuration that is different from that of first logic block 60 but which produces the same output in response to equivalent inputs. Second logic block 62 encodes the tags in question, as will be described below, before the difference operation is performed. Alternatively, second logic block 62 can encode the output of the difference function i.e. after the differences between the tag sub-stores have been identified, as will be described in further detail below.

The encoding function implemented by first 60 and second 62 logic blocks allows a reduction of the size of the distinguishing bit RAM 50 and the size of multiplexer 52, while retaining the same prediction hit rate. For illustration purposes consider a desired reduction of multiplexer 52 from 8 inputs to 3 inputs, and a comparable reduction of the storage size of DBR 50 from 3 bits per storage location to 2 bits per storage location (excluding complement values which will add one additional bit to each storage location). Such a reduction can be realized through the implementation of logic blocks 60 and 62.

3. Design of the encoding logic

First and second logic blocks (60 and 62 respectively) implement an encoding function for mapping the memory address tag, issued on line 23a, to a fewer number of bits. Based upon the desired number of inputs to multiplexer 66, logic blocks 60 and 62 can be designed using the following pseudo-code algorithm:

$$\text{For } (n = 0; n = \text{desired number of Multiplexer inputs}; n++) \quad (1)$$

{

Logic Block Output $n =$ $$\sum_{b=0}^{\substack{\text{desired} \\ \text{number of} \\ \text{Max inputs}-1}} \text{Logic Block input bit}(n + (b \times \text{number of inputs}))$$

}

The term "Logic Block Output n" in algorithm (1) refers to the $n^{th}$ output bit of the logic block of interest. Likewise, the term "Logic Block Input bit (n)" refers to the $n^{th}$ input bit of the logic block of interest. The term "desired number of Mux inputs" refers to the desired size of multiplexer 52, expressed as the required number of input ports. Further, the symbol "Σ" indicates that each element of the series is exclusively or'd together, as will be apparent from the illustrations given below.

Applying the pseudo-code algorithm (1) to the above mentioned system requirements yields the following exclusive-or logic for first logic block 60, described with respect to the appropriate memory address tag bits (i.e. the inputs to first logic block 60):

$$\text{For } (n = 0; n = 3; n++)$$

{

$$\text{Logic Block Output } n = \sum_{b=0}^{2} \text{memory address tag bit}(n + (b \times 3))$$

}

First logic block output 0=(Memory address tag bit 0) xor (Memory address tag bit 3) xor (Memory address tag bit 6)

First logic block output 1=(Memory address tag bit 1) xor (Memory address tag bit 4) xor (Memory address tag bit 7)

First logic block output 2=(Memory address tag bit 2) xor (Memory address tag bit 5)

Further, algorithm (1) yields the following exclusive-or logic for second logic block 62, described with respect to the corresponding tag sub-store difference value (i.e. the inputs to second logic block 62):

Second logic block output 0=(tag sub-store difference bit 0) xor (tag sub-store difference bit 3) xor (tag sub-store difference bit 6)

Second logic block output 1=(tag sub-store difference bit 1) xor (tag sub-store difference bit 4) xor (tag sub-store difference bit 7)

Second logic block output 2=(tag sub-store difference bit 2) xor (tag sub-store difference bit 5)

Figure 4:
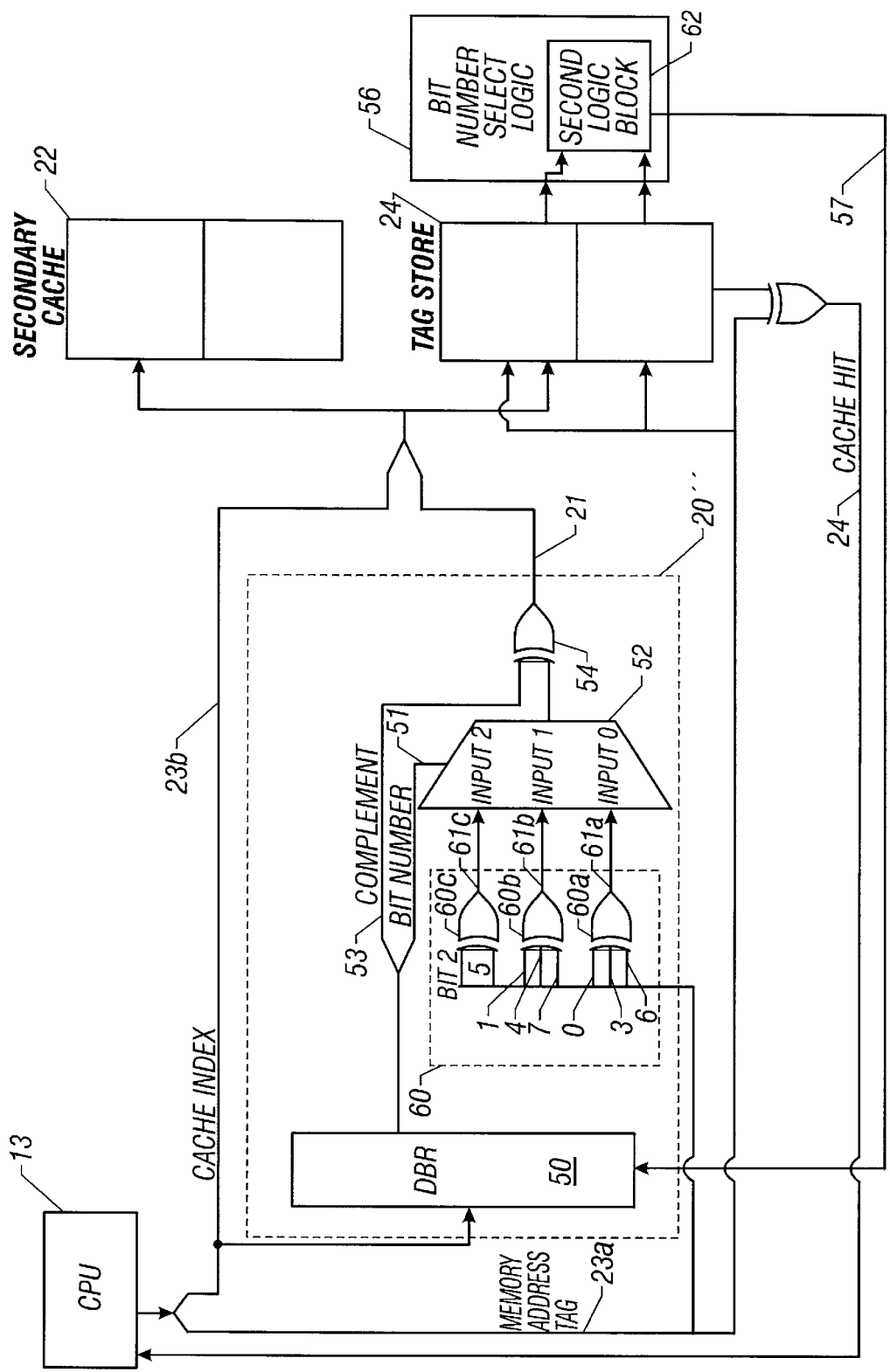
FIGS. 4 and 5 depict a specific embodiment of the first and second logic blocks of FIG. 6.
Figure 5:
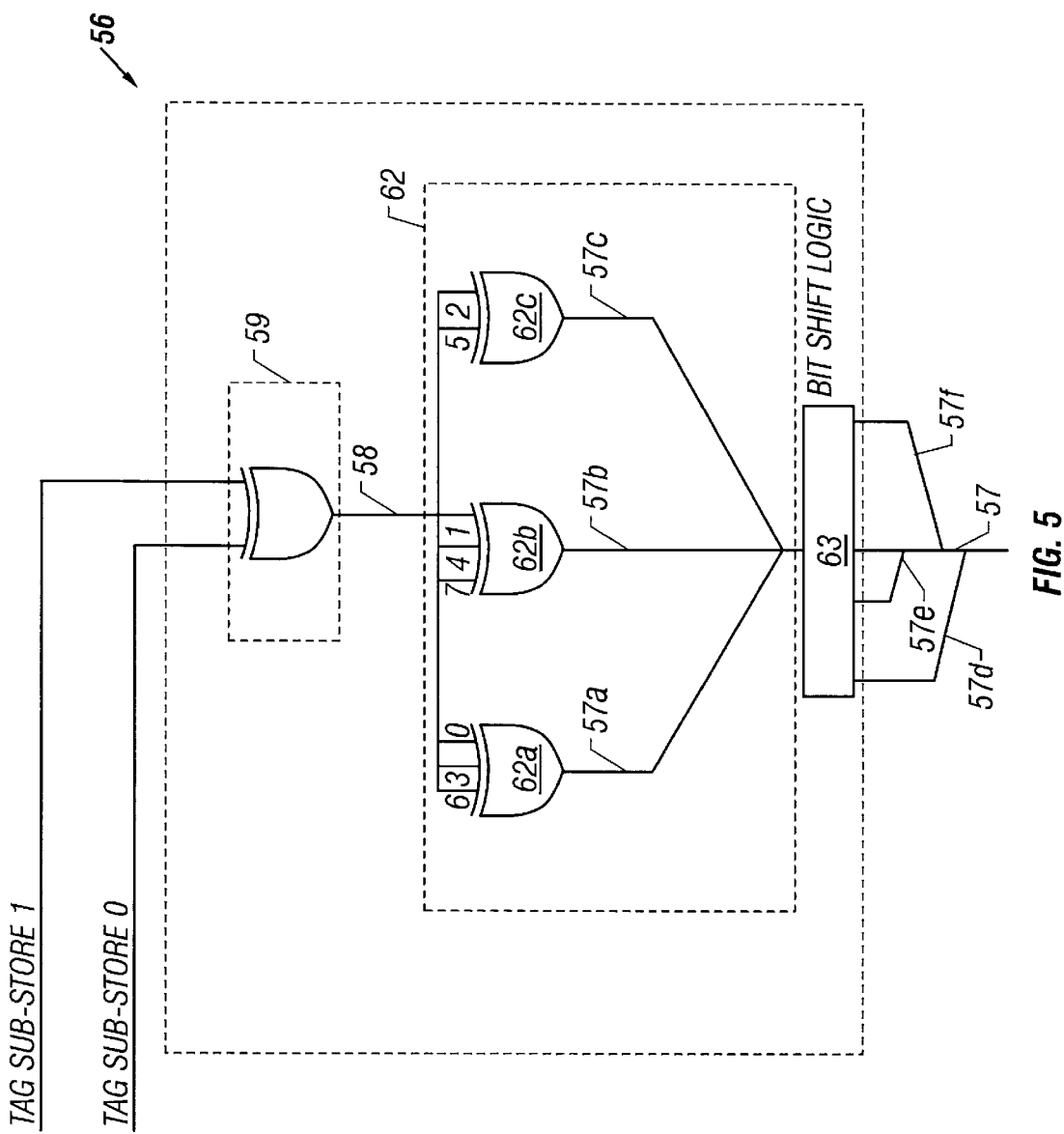

Referring now to FIGS. 4 and 5, the results specified above are shown implemented in logic blocks 60 and 62 respectively. Considering FIG. 4, first logic block 60 is shown to receive selected bits of memory address tag 23*a* as inputs to exclusive-or gates 60*a*, 60*b*, and 60*c*. Bits 0, 3, and 6 of memory address tag 23*a* are input to exclusive-or gate 60*a*. The output 61*a* of exclusive-or gate 60*a* becomes the least significant input to multiplexer 52. Bits 1, 4, and 7 of memory address tag 23*a* are input to exclusive-or gate 60*b*. The output of exclusive-or gate 60*b* becomes the next most significant input to multiplexer 52. Lastly, bits 2 and 5 of memory address tag 23*a* are input to exclusive-or gate 60*c*. The output of exclusive-or gate 60*c* becomes the most significant input to multiplexer 52. In combination, the exclusive-or gate outputs 61*a*–61*c* comprise an encoded version of memory address tag 23*a*.

Referring now to FIG. 5, bit number select logic 56 is shown to include exclusive-or logic 59 coupled to second logic block 62 for transferring the output of the difference operation. Second logic block 62 is coupled to the values stored in bit shift logic 63. Exclusive-or logic 59 receives tag sub-store 0 and tag sub-store 1 from tag store 24. It will be recognized by one of ordinary skill in the art that exclusive-or logic 59 will include more than one exclusive-or device depending on the size of the tag values being compared. Because exclusive-or gates output a 0 when corresponding bits are the same, and a 1 when corresponding bits are different, exclusive-or logic 59 outputs a representation of the similar and dissimilar bits of the selected tag sub-store values, on line 58. The output of exclusive-or logic 59 is coupled to the input of second logic block 62. Second logic block 62 is shown to include three exclusive-or gates 62*a*, 62*b*, and 62*c* as determined by algorithm (1) above.

Second logic block 62 is shown to receive the representation of the differences between the values stored in tag sub-store 0 and tag sub-store 1 from exclusive-or logic 59 via line 58. Bits 0, 3, and 6 of the difference value on line 58 are input to exclusive-or gate 62*a*. The signal on output 57*a* of exclusive-or gate 62*a* becomes the least significant input to bit shift logic 63. Bits 1, 4, and 7 of the difference value on line 58 are input to exclusive-or gate 62*b*. The signal on output 57*b* of exclusive-or gate 62*b* becomes the next most significant input to bit shift logic 63. Lastly, bits 2 and 5 of the difference value on line 58 are input to exclusive-or gate 62*c*. The signal on output 57*c* of exclusive-or gate 62*c* becomes the most significant input to bit shift logic 63.

Bit shift logic 63 shifts the value provided from exclusive-or gates 62*a*–62*c* to the left by one bit, for example. That shifted value is provided to distinguishing bit RAM 50 on lines 57*d*, 57*e*, and 57*f* (hereinafter referred to as line 57). In combination, outputs 57*d*, 57*e*, 57*f* comprise an encoded version of the differences between the values stored at tag sub-store 0 and tag sub-store 1. It should be noted that while bit shift logic 63 is shown to perform a left shift of one bit, other embodiments may utilize a different shifting structure such that the value provided on line 57 agrees with the desired output of distinguishing bit 50 in response to the corresponding cache index on line 23*b*.

4. Functional operation of the cache system including encoding logic

Figure 6A:
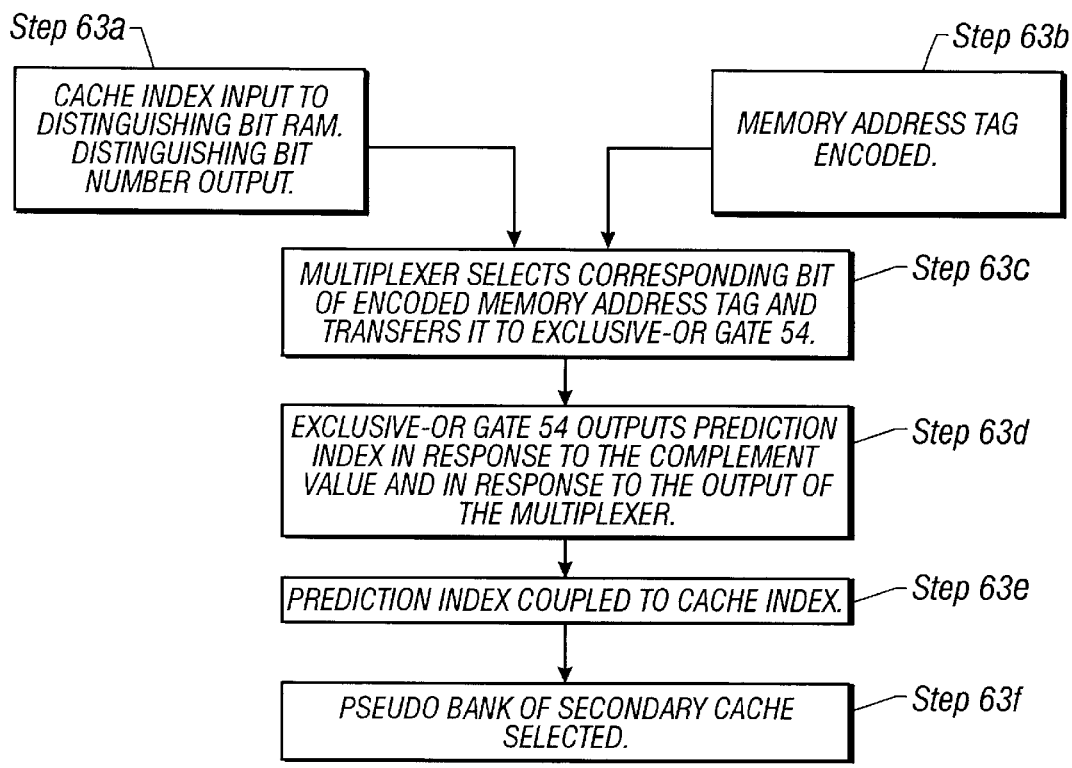
FIGS. 6A and 6B depict flow diagrams of the operation of the prediction logic of FIG. 3.

Referring now to the flow diagram of FIG. 6A, a more thorough explanation of this logic will now be given below with respect to its functional operation. In order to access secondary cache 22, a cache index on line 23*b* is input to DBR 50 (step 63*a*). DBR 50 then responsively provides an appropriate bit number on line 51.

Concurrently, memory address tag 23*a* is encoded by first logic block 60 (step 63*b*). Placing the stored bit number on line 51 selects the corresponding output bit of logic block 60 that is to be output from multiplexer 52. The output of multiplexer 52 is passed to exclusive-or gate 54 (step 63*c*).

As previously described, a complement bit is also output along with each distinguishing bit number in DBR 50 and is input to exclusive-or gate 54 along with the output of multiplexer 52. The complement bit indicates whether the value of the tag at the encoded bit number provided by DBR 50 is directly or indirectly related to the pseudo bank number. If the value of the tag at the encoded bit number is indirectly related to the pseudo bank number, the prediction index on line 21 will be the inverse of the value of the tag bit. If the value of the tag bit at the encoded bit number is directly related to the pseudo bank number, the prediction index on line 21 will be the same as the value of the tag bit (step 63d).

The predict index on line 21 is coupled with the cache index on line 23b (step 63e). The combination of indexes selects the pseudo bank of secondary cache 22 having a bit in its corresponding tag sub-store that is identical to the corresponding bit of the memory address tag identified by the value on line 51 (step 63f). Accordingly, the correct pseudo bank of secondary cache 22 is chosen without having to decode set numbers, as would be required if a set associative cache memory were used.

5. Generation of distinguishing bit numbers

Figure 6B:
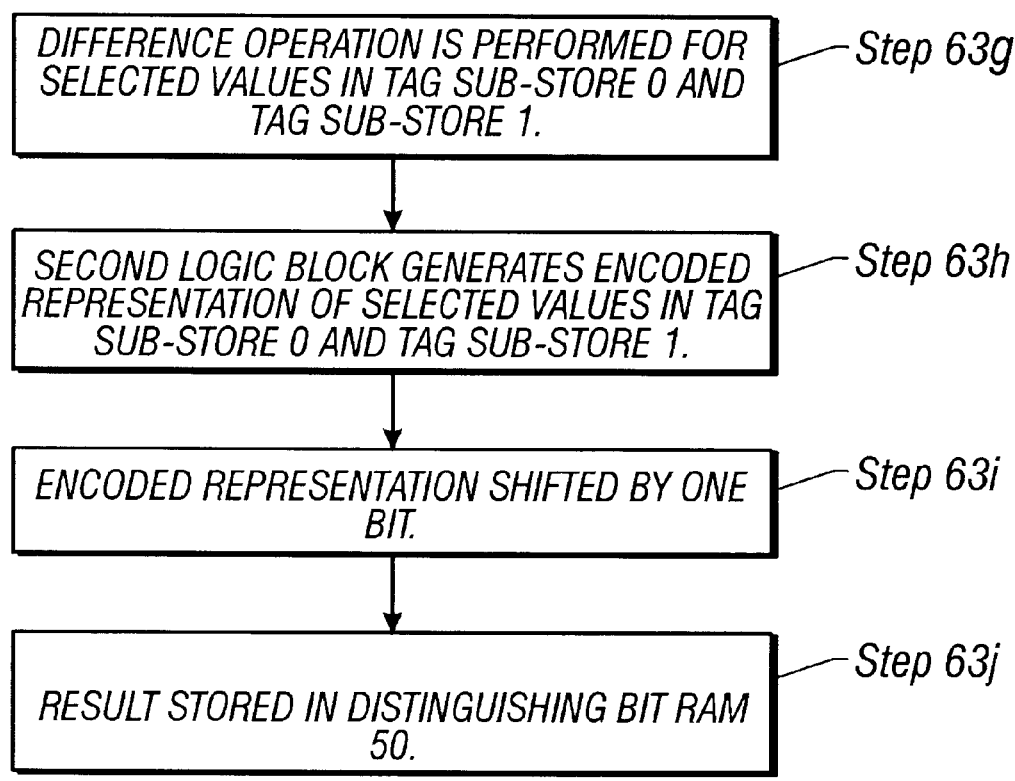

Referring now to the flow diagram of FIG. 6B, each time a new data element is stored in secondary cache 22 (and hence each time the contents of tag store 24 change) the bit number select logic 56 provides DBR 50 with the bit number to be stored at the storage location corresponding to that data elements cache index. To do so, bit number select logic 56 determines the bit number of a difference between the tag sub-store for pseudo bank 0 and the tag sub-store for pseudo bank 1 corresponding to the cache index of the new data element (step 63g). Bit number select logic 56 uses second logic block 62 to generate an encoded representation of those corresponding values (step 63h). For example, assume that the tag sub-store for pseudo bank 0 has a binary value of 11101111 and the tag sub-store for pseudo bank 1 has a binary value of 11111111. In order to find the difference between the two tag sub-store values, a difference function is performed by exclusive-or logic 59. Because exclusive-or logic outputs a binary 1 when the corresponding inputs are dissimilar, and a binary 0 when they are similar, the difference function outputs the value 00010000 on line 58. Therefore, the difference between the tag sub-store for pseudo bank 0 and the tag sub-store for pseudo bank 1 is identified in bit 4. Bit number select logic 56 inputs the result of that difference operation to logic block 62. Second logic block 62 performs the encoding function, as determined by algorithm (1) or by a functional equivalent, which results in the value 010 output from exclusive-or gates 62a–62c.

Alternatively it should be noted that bit number select logic 56 can be designed such that the value of the tag sub-store for pseudo bank 0 and pseudo bank 1 are input to second logic block 62 before performing the difference operation. One of ordinary skill in the art will recognize that the results are the same in either case.

Thereafter, the bit shift logic 63 of bit number select logic 56 performs a left shift of one bit (step 63i) that translates the value output from logic block 62 into a binary 01. The bit difference is therefore identified at encoded bit 1, which corresponds to bit 4 of the un-encoded value.

The result of the difference operation by bit number select logic 56 is provided to DBR 50, via line 57, for storage in the DBR location that is associated with the corresponding cache index (step 63j). Subsequently, when a cache index on line 23b accesses the location in DBR 50 where the value is stored, DBR 50 outputs the binary value 01 indicating that input 1 of multiplexer 52 should be output to xor gate 54 in order to select the appropriate pseudo bank of secondary cache 22.

6. A further embodiment including a plurality of distinguishing bit RAMs

Figure 7:
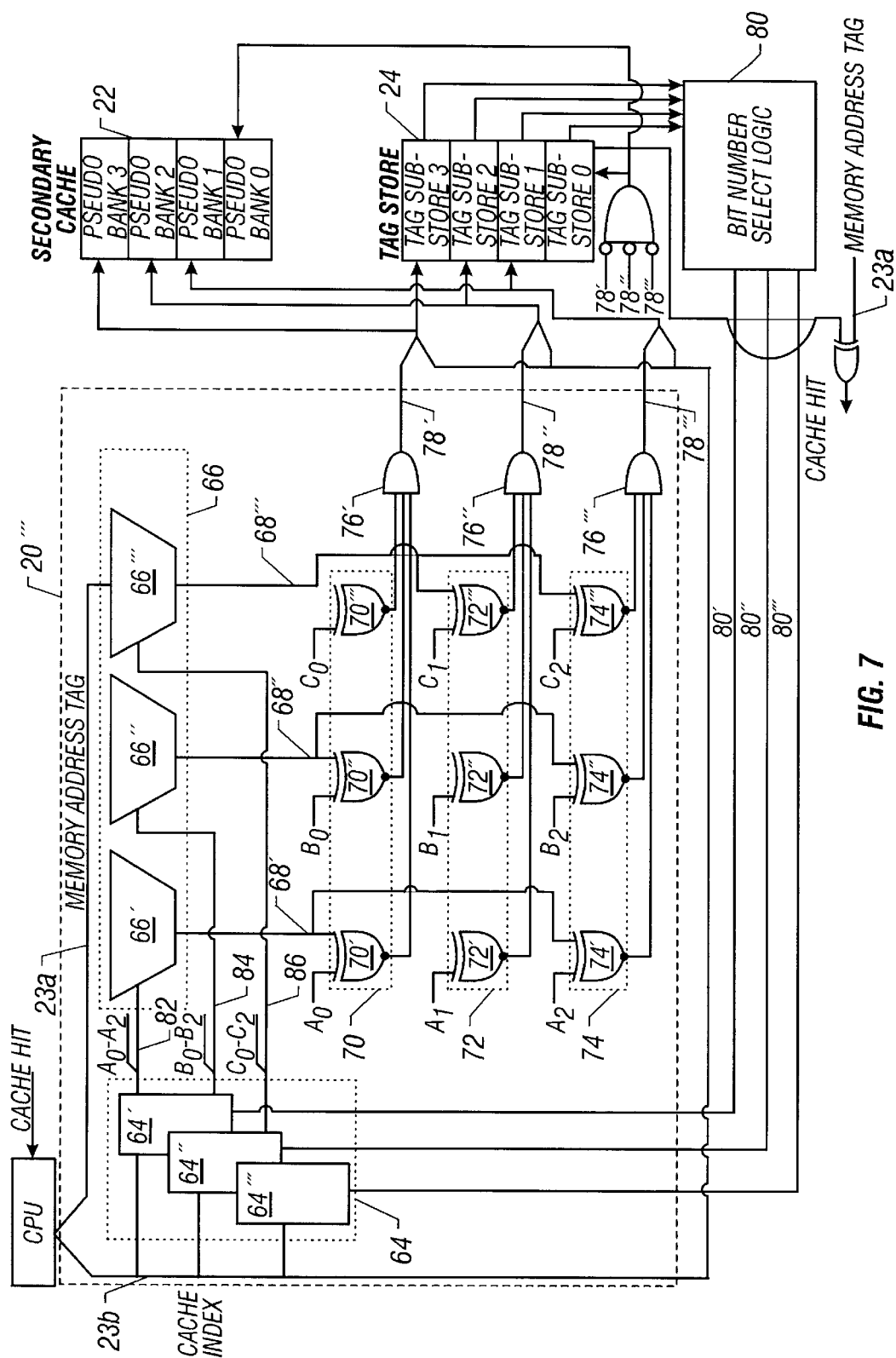
FIG. 7 depicts a further embodiment of the prediction logic of FIG. 1 including a plurality of distinguishing bit RAMs.

Referring now to FIG. 7, a further embodiment of the prediction logic 20''' is shown to include a plurality of distinguishing bit RAMs 64', 64'', 64''' each coupled to the selection input for one of a plurality of multiplexers 66. Each one of the plurality of multiplexers 66 receives the memory address tag on line 23a and provides an output signal on lines 68', 68'', 68''' respectively. The output signals on lines 68', 68'' and 68''' are coupled to three levels of exclusive-nor gates 70, 72 and 74. Further, the outputs of each of the plurality of exclusive-nor gates 70, 72, and 74 are respectively coupled to the inputs of And gates 76', 76'' and 76'''. The outputs of And gates 76', 76'' and 76''' are each appended to the cache index on line 23b. Each combination of indexes select the pseudo bank of secondary cache 22 having at least one bit of a value stored in its corresponding tag sub-store that is identical to the corresponding bit of the memory address tag, (as identified by the bit number values on lines 82, 84, and 86).

In such a system, one less than the number of tag sub-stores included in tag store 24 determines the number of distinguishing bit RAMs 64, multiplexers 66, And gates 76, and levels of xnor gates 70, 72, 74 that are implemented in the prediction logic. Accordingly, if the number of tag sub-stores was N, there would be N−1 of each of the aforementioned components. For illustration purposes, consider the cache subsystem of FIG. 7 which includes four tag sub-stores. As specified above, the prediction logic 20''' minimally includes three distinguishing bit RAMs 64' 64'', 64''', three multiplexers, three levels of exclusive-nor gates 70–74, and three And gates 76.

As previously described, the distinguishing bit RAMs store a bit number (referred to as a distinguishing bit number) for each location of a tag sub-store for a first selected pseudo bank of secondary cache 22 (i.e. the location of a newly stored data element) that differs from the corresponding location of a tag sub-store for a second selected pseudo bank of secondary cache 22. The bit number can be any bit number at which the two tags differ. Accordingly, a variety of methods may be used by the bit number select logic 80 to select a bit number to be stored in DBRs 64. The DBRs 64 receive the above mentioned bit number from bit number select logic 80, via lines 80', 80'', and 80''', as will be described below. The value of the tag sub-store at the distinguishing bit number [(e.g. values $A_0$–$A_2$, $B_0$–$B_2$, and $C_0$–$C_2$)] is stored in DBR 64 along with the distinguishing bit number and will be referred to as the complement values, for the present embodiment.

As specified above, the bit number select logic 80 calculates the bit numbers of the differences between the corresponding tag sub-store values for each pseudo bank. For example, assume that a data element is stored in pseudo bank 2 and that the corresponding tag sub-store for pseudo bank 2 has a binary value of 00101101. The corresponding location in the tag sub-store for pseudo bank 3 has a binary value of 00110001. In order to find the difference between the two tag sub-store values, an exclusive-or function can be performed. Because an exclusive-or function outputs a binary 1 when the corresponding inputs are dissimilar, and a binary 0 when they are similar, the function outputs the value 00011100. Therefore, the differences between the tag sub-store for pseudo bank 0 and the tag sub-store for pseudo bank 1 are identified in bits 4, 3, and 2.

7. Bit number select logic

Figure 8A:
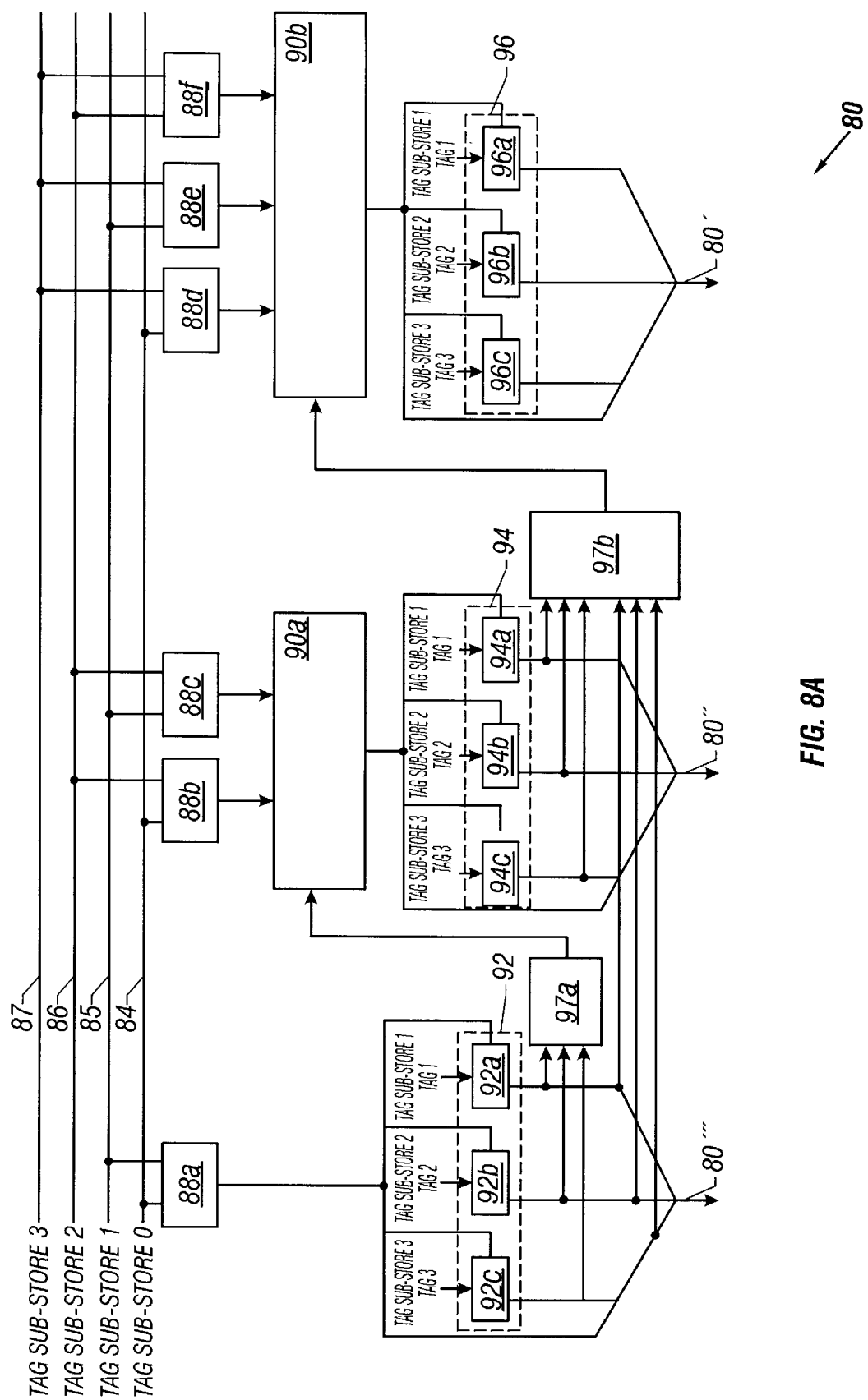
FIG. 8A, 8B and 8C depicts an embodiment of the bit number select logic of FIG. 7.

Referring now to FIG. 8A, one embodiment of bit number select logic 80 is shown with respect to the four tag sub-store configuration of FIG. 7. One of ordinary skill in the art will appreciate that if the associated tag sub-store configuration included a higher number of tag sub-stores, the logic would have to be scaled appropriately.

The bit number select logic 80 receives each tag sub-store value on separate data lines 84–87. Each possible combination of the four tag sub-store values is coupled to one of a plurality of two-input comparison logic blocks 88a–88f. Each of the comparison logic blocks 88a–88f includes the exclusive-or difference logic described above for determining the differences between two tag sub-store values. In addition, each of the individual comparison logic blocks 88a–88f includes logic for selecting the least significant bit number difference. Such logic can be implemented in one of many ways known in the art for selecting a least significant bit number. Therefore if the differences between two tag sub-store values were identified in bits 2, 3, and 4, the individual comparison logic block would output bit number 2. It should be noted that the present invention is not limited to the selection of the least significant bit number difference. Alternatively, a variety of schemes can be employed for selecting a particular bit number difference. For example, the most significant bit number difference could alternatively be selected.

Further included in bit number select logic 80 are first and second forwarding circuits 97a and 97b. First forwarding circuit 97a includes comparison logic for determining an equivalent pair of outputs from multiplexers 92a, 92b and 92c. Multiplexers 92a–92c receive tag sub-store 1, tag sub-store 2, and tag sub-store 3 values from tag store 24. The bit number output from comparison logic 88a is coupled to the selection input of multiplexers 92a–92c and selects the associated bit of each tag sub-store value. These bit values are compared by first forwarding logic in the manner described below.

Figure 8B:
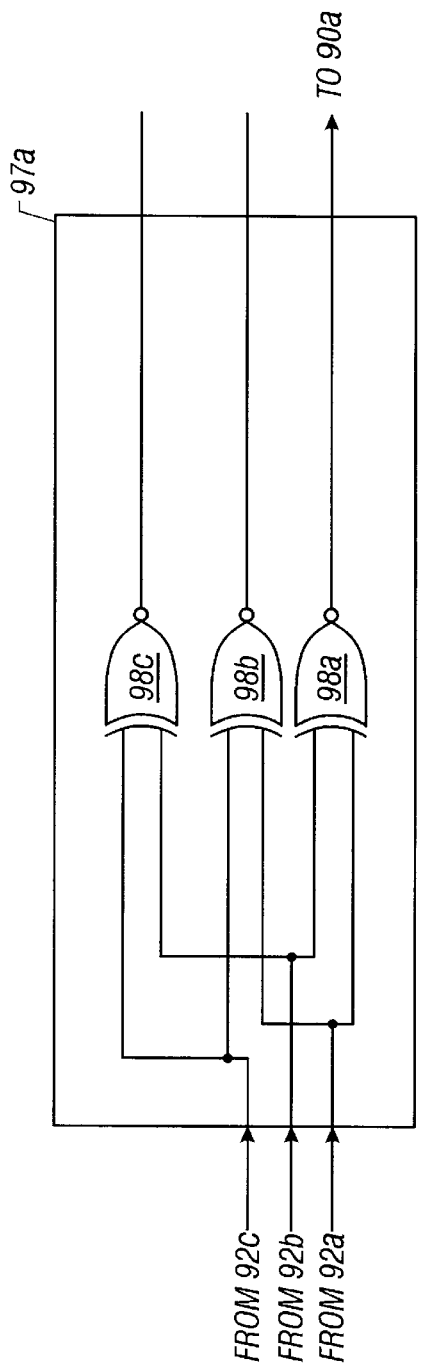

Referring to FIG. 8B, first forwarding circuit 97a is shown to include three, two-input exclusive-nor gates 98a, 98b, 98c. Exclusive-nor gate 98a compares the outputs of multiplexers 92a and 92b and outputs a binary 1 when they are equivalent. Only the single bit (having a value of '0' or '1') generated by exclusive-nor gate 98a is required to be output from first selection forwarding circuit 97a because selection logic 90a chooses between the output of two comparison logic blocks, as will be described. The outputs from exclusive-nor gates 98b and 98c would be used if selection logic 90a received more than the two inputs i.e. from comparison logic blocks. Such a scenario will be described with respect to selection logic block 90b which receives the output from three comparison logic blocks 88d, 88e, 88f.

Because first selection forwarding circuit 97a performs an exclusive-nor function between the output of multiplexer 92a (associated with tag 1) and the output of multiplexer 92b (associated with tag 2), it will output a binary 1 when those outputs are equivalent. When the outputs of multiplexers 92a and 92b are equivalent, selection logic 90a responsively outputs a binary 1 which is input to selection logic 90a. The output of comparison logic 88c is selected by selection logic 90a since it is the logic that compares tag 1 with tag 2. If the outputs of multiplexers 92a and 92b are not equivalent, then first selection forwarding circuit 97a outputs a binary 0 and selection logic 90a responsively selects the output of comparison logic 88b.

Therefore a direct relationship exists between the tags coupled to multiplexers 92 that are compared in the first selection forwarding circuit 97a, and the output of comparison logic blocks 88 that are selected as a distinguishing bit number. For example, the outputs of multiplexers 92a–92c which are compared in the first forwarding circuit 97a, are those associated with the tags compared by the comparison logic blocks 88b and 88c coupled to selection block 90a. Accordingly in the embodiment of FIG. 8A, comparison logic block 88c compares the value at tag sub-store 1 on line 85 with the value at tag sub-store 2 on line 86.

Therefore, first forwarding circuit 97a compares the output of multiplexer 92a (associated with tag 1) with the output of multiplexer 92b (associated with tag 2). Likewise comparison logic 88b compares tag 0 with tag 2. Because in this embodiment tag 0 is not input to multiplexers 92, this comparison cannot be performed in first forwarding logic 97a. Also, as described above, since selection logic 90a merely selects between two inputs, only a single selection bit is required. If the output of comparison logic block 88c is not selected, then the output of comparison logic block 88b will be selected. This relationship will be discussed in more detail with respect to second forwarding circuit 97b.

Figure 8C:
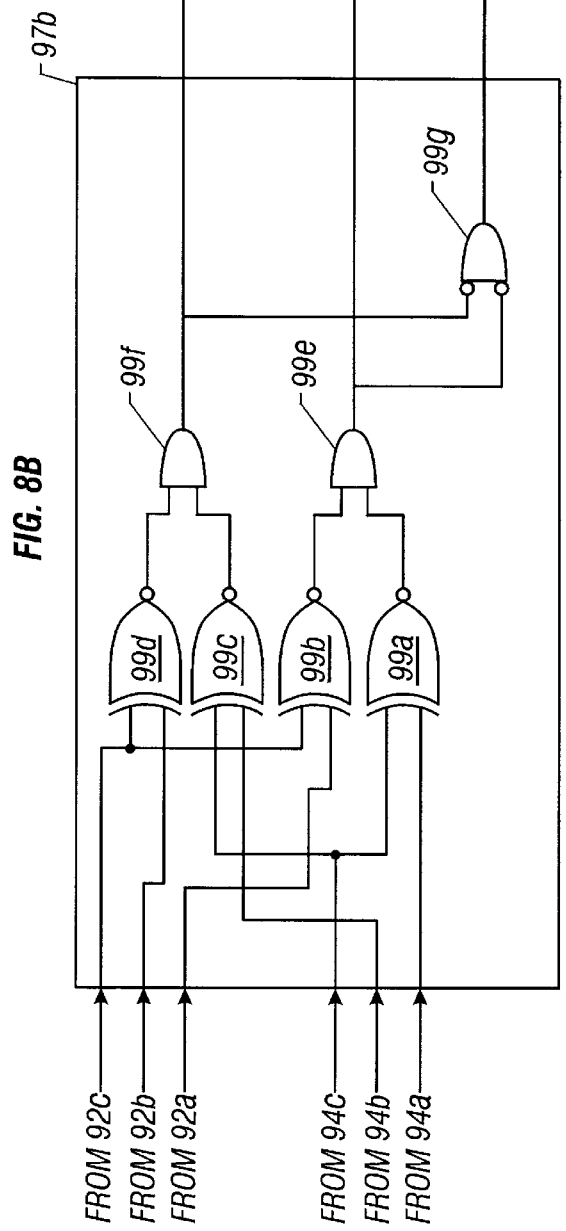

Referring now to FIG. 8C, second forwarding circuit 97b is shown to include logic for comparing the outputs from multiplexers 94a, 94b, 94c and 92a, 92b, 92c that correspond to the comparisons performed by comparison logic blocks 88d, 88e, 88f. For example, comparison logic block 88f compares the values at tag sub-stores 2 and 3. Accordingly, second forwarding circuit 97b includes exclusive-nor gate 99c which compares the output of multiplexer 94b (associated with tag sub-store 2) with the output of multiplexer 94c (associated with tag sub-store 3). Second forwarding circuit 97b also includes exclusive-nor gate 99d which compares the output of multiplexer 92b (associated with tag sub-store 2) with the output of multiplexer 92c (associated with tag sub-store 3). The output of exclusive-or-gates 99c and 99d are input to And gate 99f which outputs a binary 1 when the outputs of multiplexers 92b and 92c are equivalent and the outputs of multiplexers 94b and 94c are also equivalent.

Further, comparison logic block 88e (FIG. 8A) compares the values at tag sub-stores 1 and 3. Accordingly, second selection forwarding circuit 97b includes exclusive-nor gate. 99a which compares the output of multiplexer 94a (associated with tag sub-store 1) with the output of multiplexer 94c (associated with tag sub-store 3). Selection forwarding circuit 97b also includes exclusive-nor gate 99b which compares the output of multiplexer 92a (associated with tag sub-store 1) with the output of multiplexer 92c (associated with tag sub-store 3). The output of multiplexers 99a and 99b are input to And gate 99e which outputs a binary 1 when the outputs of multiplexers 92b and 92c are equivalent and the outputs of multiplexers 94b and 94c are also equivalent.

Further, since the embodiment of FIG. 8A does not include a multiplexer that is coupled to tag 0, a comparison between an output of a multiplexer associated with tag sub-store 0 cannot be performed. A default output is generated when the outputs of And gates 99e and 99f are false. The output of comparison logic block 88d is selected as a default. Therefore, when the outputs of And gates 99f and 99e indicate that the value of tag sub-store 3 is not equivalent to the value of tag sub-store 2 or tag sub-store 1, and gate 99g outputs a binary 1 and selection logic 90b responsively selects the output of comparison logic block 88d.

To more clearly illustrate the operation of the present embodiment of the invention, consider the case where a new data element is retrieved from main memory and is stored in secondary cache 22. Responsively, lines 84–87 have the following values:

Tag sub-store 3=00110001
Tag sub-store 2=00101101

Tag sub-store 1=00101001
Tag sub-store 0=00100001

Comparison logic block 88*a* compares the value at tag sub-store 0 with the value at tag sub-store 1. Because the difference arises in bit 3, comparison logic block 88*a* outputs a binary 0011 (i.e. decimal 3). Likewise comparison logic blocks 88*b* and 88*c* perform the same operation for tag sub-stores 0 and 2, and tag sub-stores 1 and 2 respectively. Because the least significant difference in both of these comparisons is in bit 2, comparison logic blocks 88*b* and 88*c* both output binary *0010* (i.e. decimal 2). In the same manner, comparison logic blocks 88*d*, 88*e*, and 88*f* compare tag sub-store 0 with 3, tag sub-store 1 with 3, and tag sub-store 2 with 3. Comparison logic blocks 88*d*, 88*e*, and 88*f* therefore output binary values 0101, 0011, and 0010 respectively. Accordingly, all possible comparisons of the four tag sub-store values have been computed.

The output of comparison logic block 88*a* is conveyed to the control inputs of multiplexers 92*a*–92*c*. Since the comparison logic block 88*a* output a binary 0011, bit 3 of tag sub-stores 1, 2, and 3 are selected by multiplexers 92*a*, 92*b*, and 92*c* respectively. Since bit 3 of tag sub-stores 1 and 2 are equivalent, first forwarding circuit 97*a* outputs a binary 1. Selection logic block 90*a* responsively selects the output of comparison logic block 88*c* and conveys it to multiplexers 94*a*–94*c*.

When selection logic 90*a* outputs a distinguishing bit number, it is used to select the corresponding bit of each tag coupled to multiplexers 94*a*, 94*b*, 94*c*. Each of the outputs from multiplexers 94*a*, 94*b*, 94*c* are coupled to second forwarding circuit 97*b* along with the outputs from multiplexers 92*a*, 92*b* and 92*c*. In the present case, And gates 99*e* and 99*f* output a binary 0 while And gate 99*g* outputs a binary 1. Therefore the binary value 001 is input to selection logic 90*b* which responsively selects the output of comparison logic 88*d* and outputs a binary 1000. Accordingly, three distinguishing bit numbers have been selected: 0011, 0010, and 1000.

After the distinguishing bits have been selected, and used to select the corresponding bit value from the three most significant tag sub-stores, the distinguishing bit number and the corresponding bit value can be stored in the appropriate distinguishing bit RAM 64. The values output from multiplexers 92, 94 and 96 along with the outputs from comparison logic block 88*a*, and selection logic blocks 90*a*, and 90*b* are coupled to distinguishing bit RAMs 64''', 64'', and 64' respectively. Those values are stored therein at the locations corresponding to the cache index provided on line 23*b*.

Figure 9:
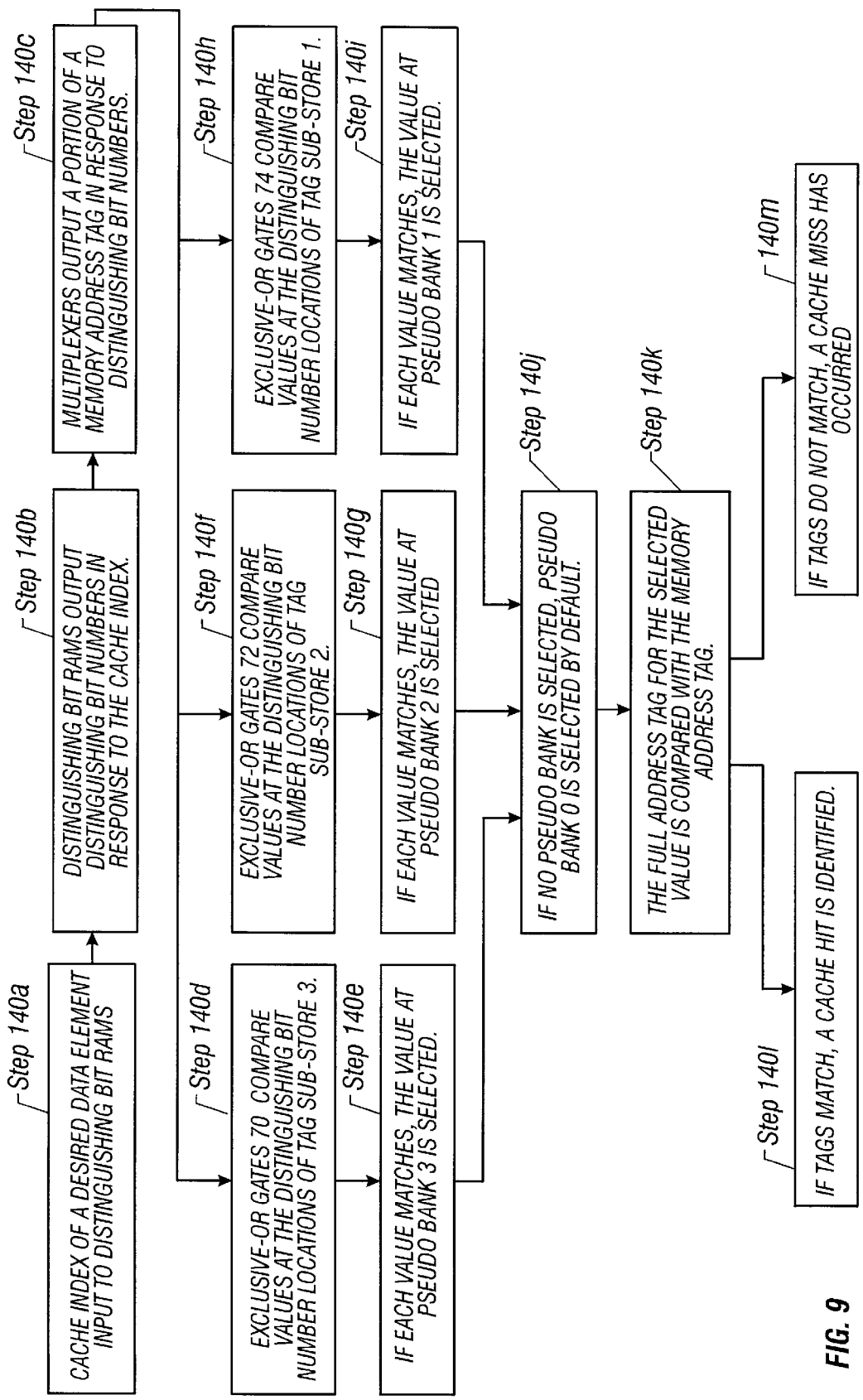
FIG. 9 depicts a flow diagram of the operation of the prediction logic of FIG. 7.

8. Operation of a Cache access in an embodiment having a plurality of distinguishing bit RAMs Now that it has been shown how the distinguishing bit RAMs 64 are loaded, an access of secondary cache 22 utilizing distinguishing bit RAMs 64 will be described with respect to the flow diagram of FIG. 9 and the embodiment of FIG. 7. In order to access secondary cache 22, a cache index on line 23*b* is input to distinguishing bit RAMs 64', 64'', and 64''' (step 140*a*). Each of the distinguishing bit RAMs then provides the corresponding distinguishing bit numbers on lines 82, 84 and 86, which are coupled to the control inputs of the associated multiplexers (step 140*b*). The distinguishing bit numbers on lines 82, 84, and 86 select the corresponding bit of memory address tag 23*a* that is to be output from multiplexers 66', 66'', and 66''' respectively (step 140*c*).

As previously described, the output of each multiplexer 66', 66'', 66''' is coupled to three levels of exclusive-nor gates 70, 72, and 74. Also coupled to the three levels of exclusive-nor gates 70, 72, and 74 are the values of each tag sub-store that were loaded into the distinguishing bit RAMs 64 at the locations identified by the cache index on line 23*b*. Each level of exclusive-nor gates compares the value of the tag sub-store values at the distinguishing bit number locations with the value of the memory address tag at a corresponding bit number location.

Continuing the illustration from above, the following table summarizes the contents of each DBR location identified by the cache index on line 23*b*:

DBR 64''': distinguishing bit number = 0011
$C_0 = 0$ (Bit 3 of tag sub-store 3)
$C_1 = 1$ (Bit 3 of tag sub-store 2)
$C_2 = 1$ (Bit 3 of tag sub-store 1)
DBR 64'': distinguishing bit number = 0010
$B_0 = 0$ (Bit 2 of tag sub-store 3)
$B_1 = 1$ (Bit 2 of tag sub-store 2)
$B_2 = 0$ (Bit 2 of tag sub-store 1)
DBR 64': distinguishing bit number = 1000
$A_0 = 1$ (Bit 4 of tag sub-store 3)
$A_1 = 0$ (Bit 4 of tag sub-store 2)
$A_2 = 0$ (Bit 4 of tag sub-store 1)

The first level of exclusive-nor gates 70, compares the three values at the distinguishing bit number locations of tag sub-store 3 (i.e. bits 4, 2, and 3 of tag sub-store 3), with the corresponding values of the distinguishing bit number location of memory address tag 23*a* (output by multiplexers 66', 66'', 66''') (step 140*d*). If each value matches, then the output of And gate 76' will assert and select secondary cache bank 3 (step 140*e*). Likewise, the second level of exclusive-nor gates 72, compares the three values at the distinguishing bit number locations of tag sub-store 2, with the corresponding values at the distinguishing bit number locations of memory address tag 23*a* (output by multiplexers 66', 66'', and 66''') (step 140*f*). If each value matches, then the output of And gate 76' will assert and select secondary cache bank 2 (step 140*g*). Lastly, the third level of exclusive-nor gates 74, compares the three values at the distinguishing bit numbers of tag sub-store 1, with the corresponding values at the distinguishing bit numbers of memory address tag 23*a* (step 140*h*). If the values each match, then the output of And gate 76''' will assert and select tag sub-store 1 (step 140*i*). Also, if none of these combinations selects a tag sub-store, the default logic selects secondary cache bank 0 (step 140*j*).

When one of the values in the secondary cache bank is selected, its full address tag value is compared with the full value of memory address tag 23*a* (step 140*k*). If those two values match, then there is a cache hit, and the data is provided to the CPU (step 140*l*). Otherwise, if the two values are different, then there is a cache miss and the data must be retrieved from memory (step 140*m*).

Continuing with the above example, assume that the address sent to the cache memory subsystem from the CPU is hexadecimal EB29. Accordingly, the eight bit memory address tag 23*a* has a binary value of 1110 1011 (hexadecimal EB). When the cache index is presented to the distinguishing bit RAMs, bit numbers 4, 2, and 3 are respectively output on lines 82, 84, and 86. Further, the values of the tag sub-stores at each of the distinguishing bit numbers are output on lines $A_0$–$A_2$, $B_0$–$B_2$, and $C_0$–$C_2$. Responsively, the values of bits 4, 2, and 3 of memory address tag 23*a* are output by multiplexers 66', 66'', and 66'''.

The first level of exclusive-nor gates 70 then compares bits 3, 2, and 4 of memory address tag 23*a* (having values 1,0,0 respectively) with the corresponding bits of tag sub-store 3 (having values 0,0,1 respectively). Since these values are not equivalent, the output of And gate 76' is not asserted and tag sub-store 3 is not selected. Likewise, the second level of exclusive-nor gates 72 then compares bits 3, 2, and 4 of memory address tag 23*a* (having values 1,0,0 respectively) with the corresponding bits of tag sub-store 2 (having values 1,1,0 respectively). Since these values are not equivalent, the output of And gate 76''' is not asserted and tag sub-store 2 is not selected. Lastly, the third level of exclusive-nor gates 74 then compares bits 3, 2, and 4 of memory address tag 23*a* (having values 1,0,0 respectively) with the corresponding bits of tag sub-store 1 (having values 1,0,0 respectively). Since these values are exactly the same, the output of And gate 76" is asserted and secondary cache bank 1 is selected. Accordingly, the full value of tag sub-store 1, binary value 00101001, is compared with the corresponding portion of memory address tag 23*a*, binary value 00101001. Since these values are also equivalent, a cache hit has occurred and therefore the cache hit signal will be asserted and the data stored in pseudo bank 1 of secondary cache 22 provided to the CPU.

Figure 10:
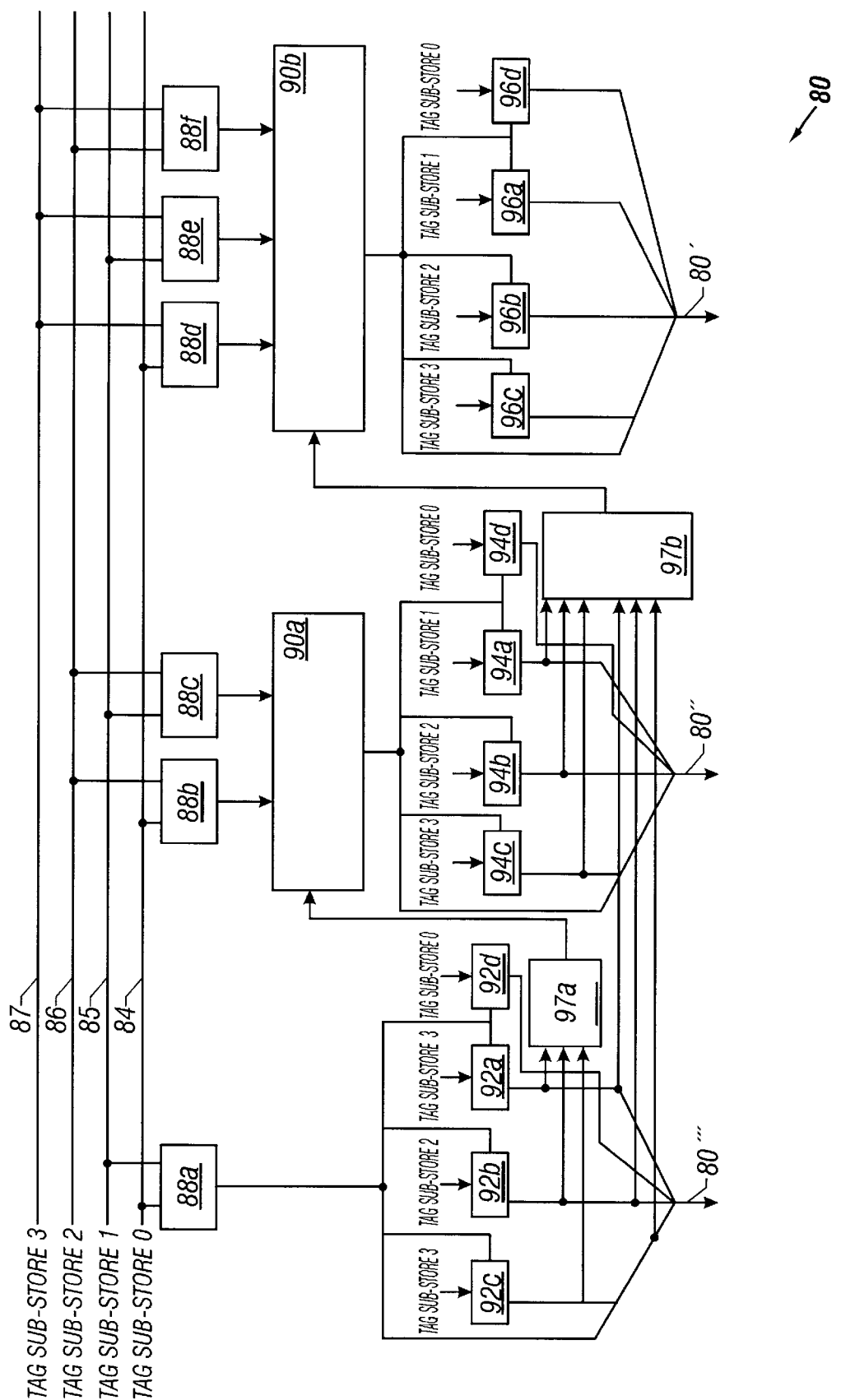
FIG. 10 depicts a further embodiment of the bit number select logic of FIG. 7.

9. A further embodiment of the bit number select logic
Referring to FIG. 10, a further embodiment of Bit number select logic 80 is shown to include an additional set of multiplexers 92*d*, 94*d*, and 96*d*. Accordingly, the data inputs of multiplexers 92*d*, 94*d*, and 96*d* are each coupled to the value of tag sub-store 0. The output of comparison logic block 88*a* is input to the control input of multiplexer 92*d* in order to select the value of the distinguishing bit location in tag sub-store 0. The output of multiplexer 92*d*, along with the output of comparison logic block 88*a*, is coupled to distinguishing bit RAM 64''' via bus 82''', and is stored therein. Likewise, the output of selection logic blocks 90*a* and 90*b* are input to the control inputs of multiplexers 94*d* and 96*d*, respectively, to select the value of the associated distinguishing bit locations of tag sub-store 0. The output of multiplexers 94*d* and 96*d*, along with the output of selection logic blocks 90*a* and 90*b* respectively, are coupled to distinguishing bit RAMs 64", and 64' via busses 82" and 82' respectively. Such an embodiment would also include an extra set of exclusive-or gates to compare the value of tag sub-store 0 at the distinguishing bit number locations with the corresponding bit number locations of the memory address tag 23*a*.

Figure 11:
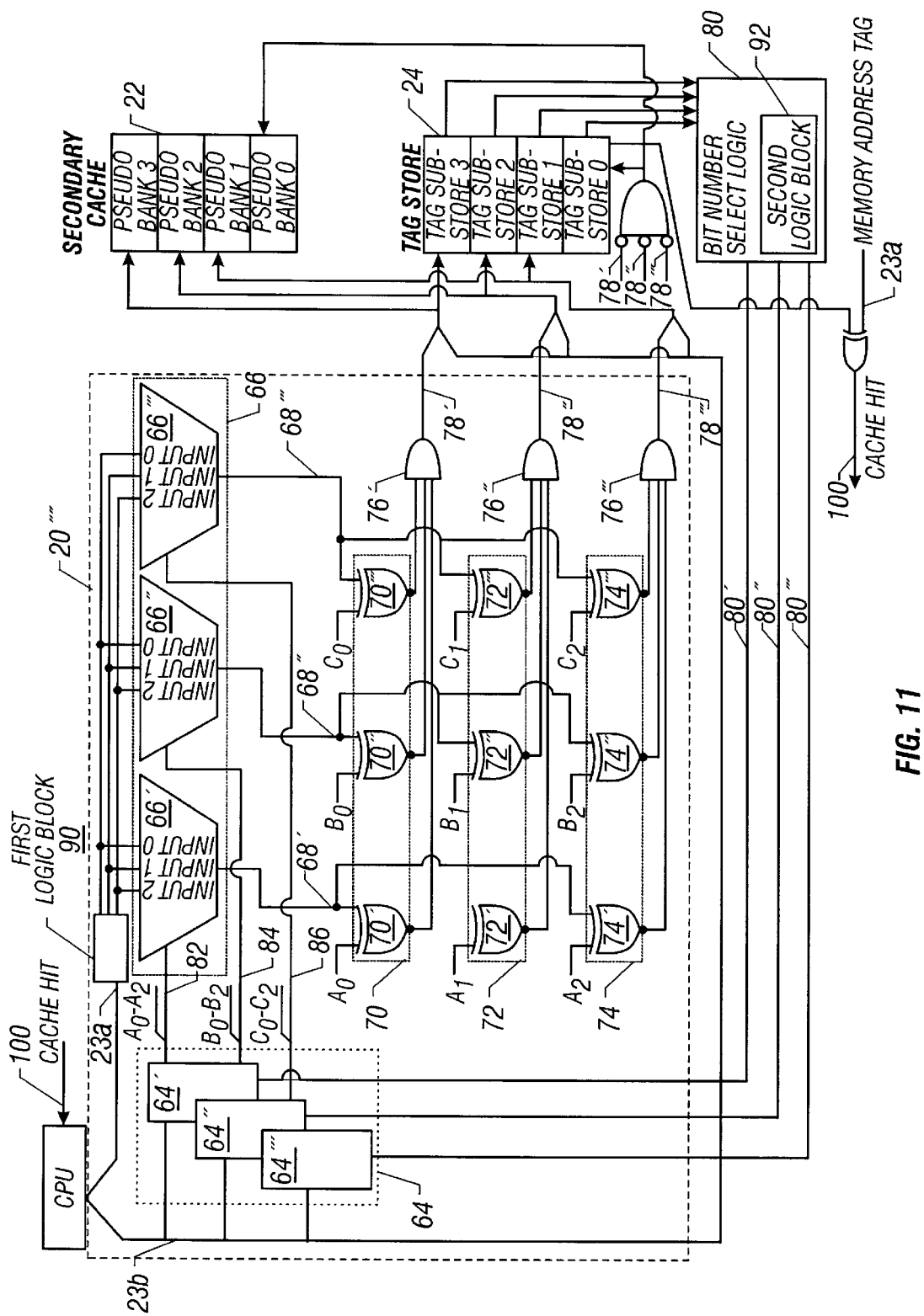
FIG. 11 depicts a further embodiment of the prediction logic of FIG. 7.

10. A further embodiment including a plurality of tag sub-stores and encoding logic
Referring now to FIG. 11, a further embodiment of the prediction logic 20'''' is shown to include a first logic block 90, coupled to the inputs of multiplexers 66', 66", and 66''', and a second logic block 92 incorporated into bit-number select logic 80. The first and second logic blocks implement an encoding function that allows a reduction of the size of the distinguishing bit RAMs 64 and the size of multiplexers 66 while retaining the same prediction hit rate.

For illustration purposes consider a desired reduction of each multiplexer 66', 66", and 66''' from 8 inputs to 3 inputs, and a comparable reduction of the storage size of each distinguishing bit RAM 64 from 3 bits per storage location to 2 bits per storage location (excluding storage space for complement values). Such a reduction can be realized through the implementation of logic blocks 90 and 92. Based upon the desired number of inputs to multiplexers 66, logic blocks 90 and 92 can be designed using algorithm (1) above. The results of algorithm (1) are as follows:

Multiplexer Input 0 =
   (Memory address tag bit 0) xor (Memory address tag bit 3) xor (Memory address tag bit 6)
Multiplexer Input 1 =
   (Memory address tag bit 1) xor (Memory address tag bit 4) xor (Memory address tag bit 7)
Multiplexer Input 2 =
   (Memory address tag bit 2) xor (Memory address tag bit 5)

Figure 12:
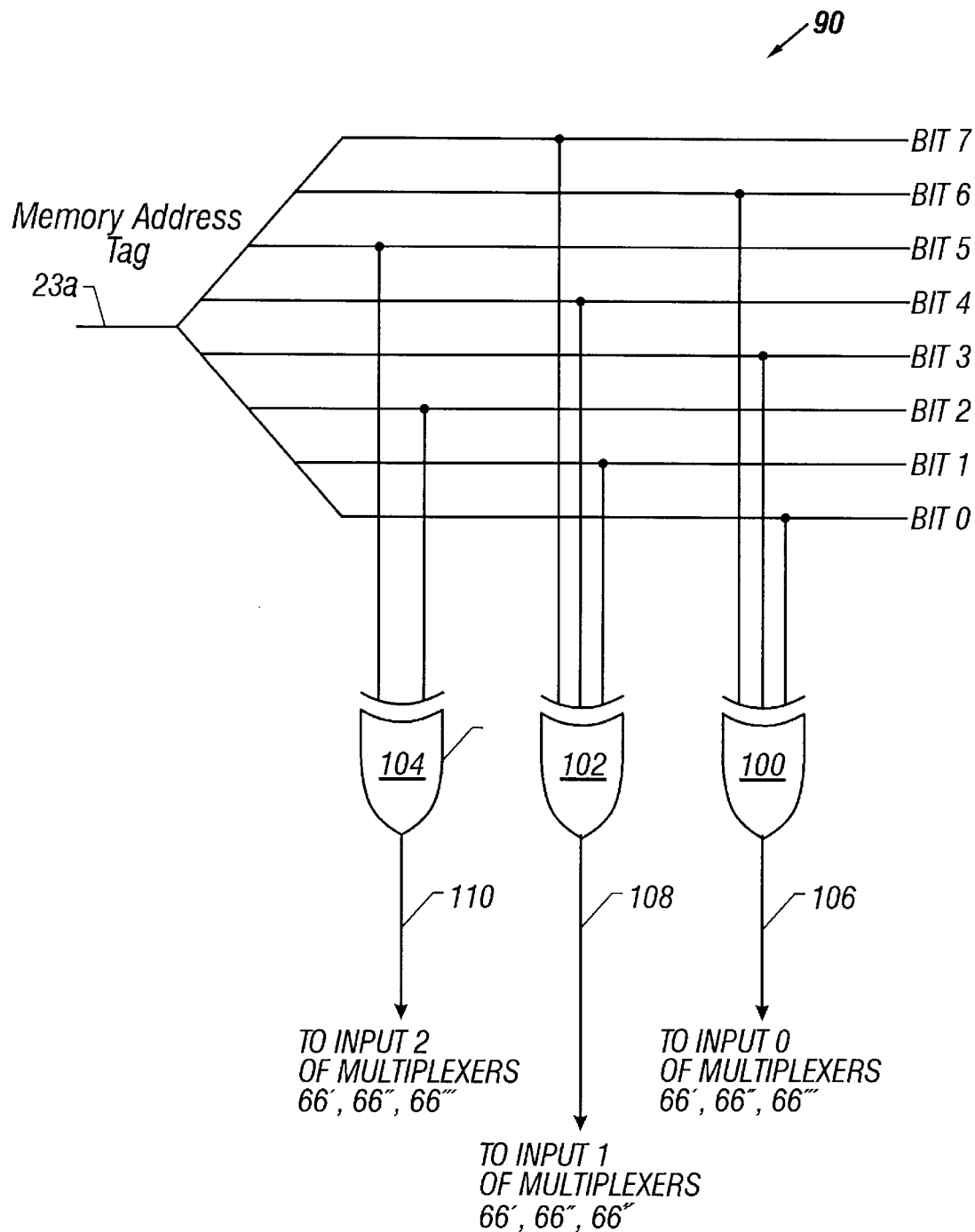
FIG. 12 depicts a specific embodiment of the first logic block of FIG. 11.

Referring now to FIG. 12, the results of algorithm (1) are shown implemented in first logic block 90. Bits 0, 3, and 6 of memory address tag 23*a* are coupled to the inputs of exclusive-or gate 100. The output of exclusive-or gate 100 is coupled to the least significant input (designated as input 0) of each multiplexer 66', 66", and 66'''. Further, bits 1, 4, and 7 of memory address tag 23*a* are coupled to the inputs of exclusive-or gate 102. The output of exclusive-or gate 102 is coupled to the next, more significant, input (designated as input 1) of each multiplexer 66', 66", and 66'''. Lastly, bits 2 and 5 of memory address tag 23*a* are coupled to the inputs of exclusive-or gate 104. The output thereof is coupled to the most significant input (designated as input 2) of each multiplexer 66', 66", and 66'''.

Figure 13:
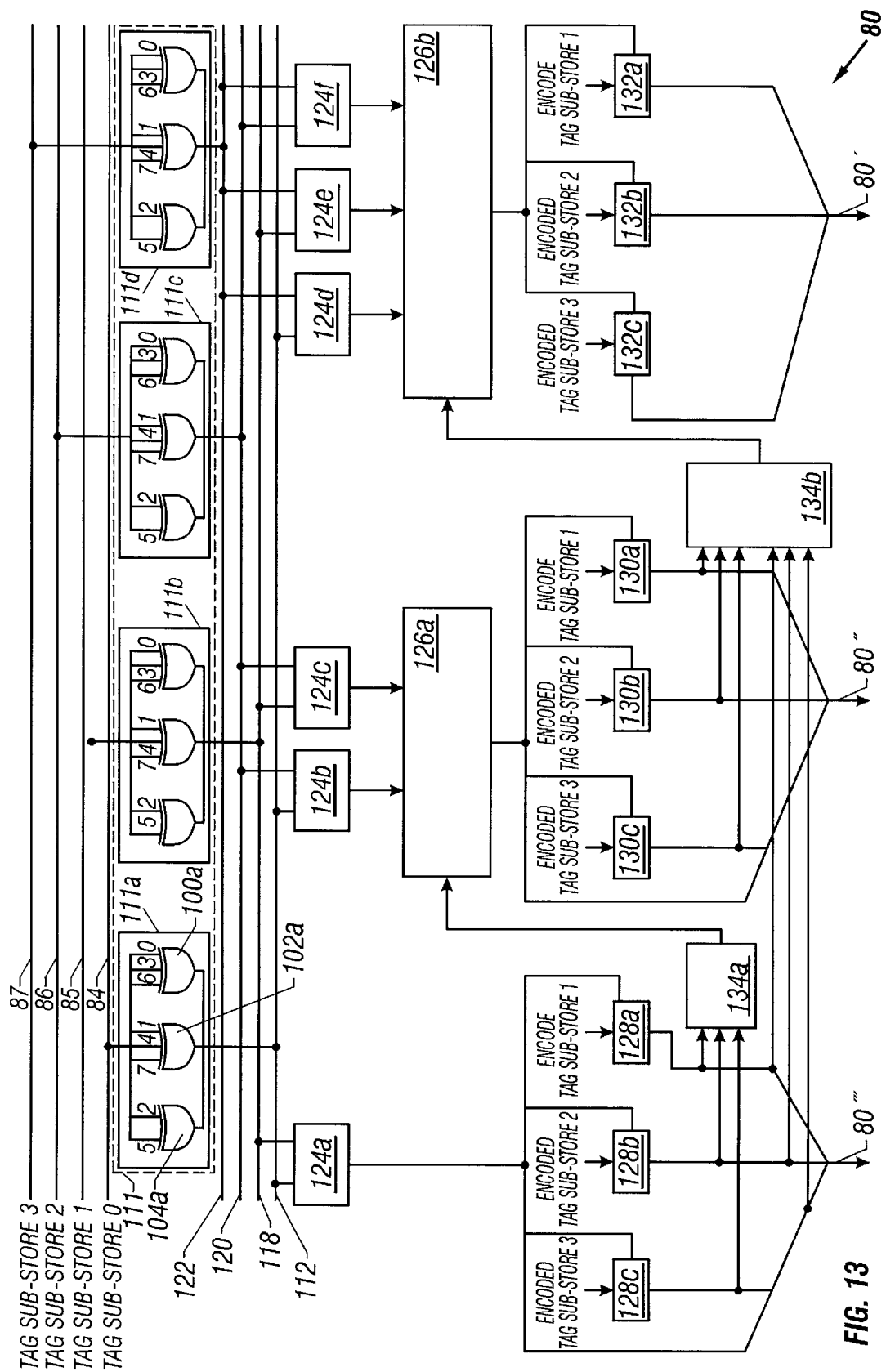
FIG. 13 depicts a specific embodiment of the bit number select logic of FIG. 11.

Referring now to FIG. 13, bit number select logic 80 is shown to receive the value of each tag sub-store on separate data lines 84–87, each coupled to second logic block 111. The tag sub-store values are encoded by second logic block 111 before the distinguishing bits are determined. Second logic block 111 outputs an encoded, reduced size version of each tag sub-store value. Accordingly, since there are fewer bits of the tag sub-store value, the distinguishing bit numbers will also have a reduced size and require less storage space in the distinguishing bit RAMs 64.

Second logic block 111 includes several subordinate logic blocks 111*a*–111*d*, i.e. one subordinate logic block for each tag sub-store. Each subordinate logic block 111*a*–111*d* includes functionality equivalent to first logic block 90 and operates on the tag sub-store that is input thereto.

Consider logic block 111*a* which receives tag sub-store 0 (as input). Bits 0, 3, and 6 of tag sub-store 0 are coupled to the inputs of exclusive-or gate 100*a*. The output of exclusive-or gate 100*a* becomes the least significant bit of the encoded version of tag sub-store 0 on bus 112. Bits 1, 4, and 7 of tag sub-store 0 are coupled to the inputs of exclusive-or gate 102*a*. The output of exclusive-or gate 102*a* becomes the next most significant bit of the encoded version of tag sub-store 0 on bus 112. Lastly, bits 2 and 5 of tag sub-store 0 are coupled to the inputs of exclusive-or gate 104*a*. The output of exclusive-or gate 104*a* becomes the most significant bit of the encoded version of tag sub-store 0 on bus 112.

Likewise, the values of tag sub-stores 1, 2, and 3 are correspondingly coupled to the exclusive-or gates that comprise logic blocks 111*b*, 111*c*, 111*d*. The outputs of the exclusive-or gates that comprise logic blocks 111*b*, 111*c*, 111*d* become the encoded versions of tag sub-stores 1, 2, 3 on lines 118, 120, 122 respectively. After the encoded versions of the tag sub-stores have been generated, the distinguishing bit calculation previously described is performed on these values.

Each possible combination of the four encoded tag sub-store values is coupled to a two-input comparison logic block 124*a*–124*f*. Each of the comparison logic blocks 124a–124f include the exclusive-or difference logic previously described for determining the differences between two encoded tag sub-stores. In addition, each of the individual comparison logic blocks 124a–124f include logic for selecting the least significant bit number difference. Accordingly, the comparison logic blocks 124a–124f output the bit number of the least significant difference between each pair of encoded tag sub-store values. These difference bit numbers are input to a second stage comparison logic 126 that, along with forwarding circuits 127, selects the distinguishing bit numbers that will be provided to DBRs 64 in the manner previously described.

For illustration purposes consider the case where the four tag sub-stores have the following selected values:
   tag sub-store 3=00110001
   tag sub-store 2=00101101
   tag sub-store 1=00101001
   tag sub-store 0=00100001

The values of tag sub-stores 0, 1, 2 and 3 are input to subordinate logic blocks 111a, 111b, 111c, 111d respectively. Each subordinate logic block outputs an encoded version of the tag sub-stores which, for the present illustration, have the following values:
   Encoded tag sub-store 3=111
   Encoded tag sub-store 2=001
   Encoded tag sub-store 1=101
   Encoded tag sub-store 0=101

Comparison logic block 124a compares encoded tag sub-store 0 with encoded tag sub-store 1. Because the two encoded tag sub-stores are equivalent, it does not matter what value is output from comparison logic block 124a. For the purposes of this example, comparison logic block 124a is designed to output a default value of binary 0000. Likewise comparison logic blocks 124b and 124c perform the same operation for encoded tag sub-stores 0 and 2, and encoded tag sub-stores 1 and 2 respectively. Because the least significant difference in both of these comparisons is in bit 2, comparison logic blocks 124b and 124c both output binary 0010 (i.e. decimal 2). In the same manner, comparison logic blocks 124d–124f compare the value of encoded tag sub-store 0 with encoded tag sub-store 3, encoded tag sub-store 1 with 3, and encoded tag sub-store 2 with 3, respectively. Comparison logic blocks 124d–124f then output binary values 0001, 0001, and 0001 respectively. Accordingly, all possible two-value comparisons of the four tag sub-store values have been computed.

The data inputs of multiplexers 128a–128c are coupled to the value of encoded tag sub-store 1, encoded tag sub-store 2, and encoded tag sub-store 3, respectively. The output of comparison logic block 124a is coupled to the control input of three multiplexers 128a–128c in order to select the value of the distinguishing bit location. The output of each multiplexer 128a–128c, along with the output of comparison logic block 124a, is coupled to distinguishing bit RAM 64''' via bus 82'''.

Likewise, the output of selection logic block 126a is coupled to the control inputs of multiplexers 130a–130c, and the output of selection logic block 126b is coupled to the control inputs of multiplexers 132a–132c. The output of multiplexers 130a–130c and 132a–132c, along with the outputs of selection logic blocks 126a and 126b, are coupled to distinguishing bit RAMs 64'' and 64' respectively.

In the present illustration, since comparison logic block 124a outputs a binary 0, bit 0 of encoded tag sub-store 1, encoded tag sub-store 2, and encoded tag sub-store 3 will be output from multiplexers 128a, 128b, and 128c respectively.

Therefore multiplexers 128a, 128b, and 128c each output a binary 1. The output signals from multiplexers 128a–128c are coupled to first forwarding circuit 134a. As previously described, first forwarding circuit 134a outputs a binary 1 when the outputs of multiplexers 128b and 128a are equivalent. The output of first forwarding circuit 134a is coupled to selection logic 126a. Because a binary 1 at the output of first forward circuit 134a indicates that the value of encoded tag sub-store 1 and encoded tag sub-store 2 at the first selected distinguishing bit number are equivalent, selection logic block 126a will select the output of comparison logic block 124c. This selection is performed because comparison logic block 124c compares encoded tag1 and encoded tag2. Accordingly, selection logic 126a outputs a binary 0010.

The output of selection logic 126a is coupled to the control input of multiplexers 130a–130c. Since selection logic 126a outputs a binary 0010 (decimal 2), multiplexers 130a–130c each select bit 2 of encoded tag sub-store 1 (binary 1), encoded tag sub-store 2 (binary 0), and encoded tag sub-store 3 (binary 1) respectively. Each of the outputs of multiplexers 130a–130c and 128a–128c are further coupled to second forwarding circuit 134b. Second forwarding circuit 134b functions similarly as second forwarding circuit 97b of FIG. 10C. Therefore, second forwarding circuit 134b includes logic for comparing the output from multiplexers 130a–130c, and 128a–128c which correspond to the comparisons performed by comparison logic blocks 124d–124f.

In the present illustration, second forwarding circuit 134b outputs a binary 010 indicating that bits 0 and 2 of encoded tag sub-store 1 and encoded tag sub-store 3 are equivalent. Therefore selection logic 126b responsively selects the value from comparison logic block 124e and outputs a binary 0001. Therefore, three distinguishing bit numbers (0000, 0010, 0001) have been selected. After the distinguishing bits have been selected, they are used to select the corresponding bit value from each of the three most significant encoded tag sub-stores. The values output from multiplexers 128a–128c, 130a–130c and 132a–132c along with the outputs from comparison logic block 124a, selection logic block 126a, and selection logic block 126b, are coupled to distinguishing bit RAMs 64''', 64'', and 64', respectively, and are stored therein. It should be recognized that bit number select logic 80 will have to re-calculate the distinguishing bit numbers each time a cache fill operation is performed for secondary cache 22.

Figure 14:
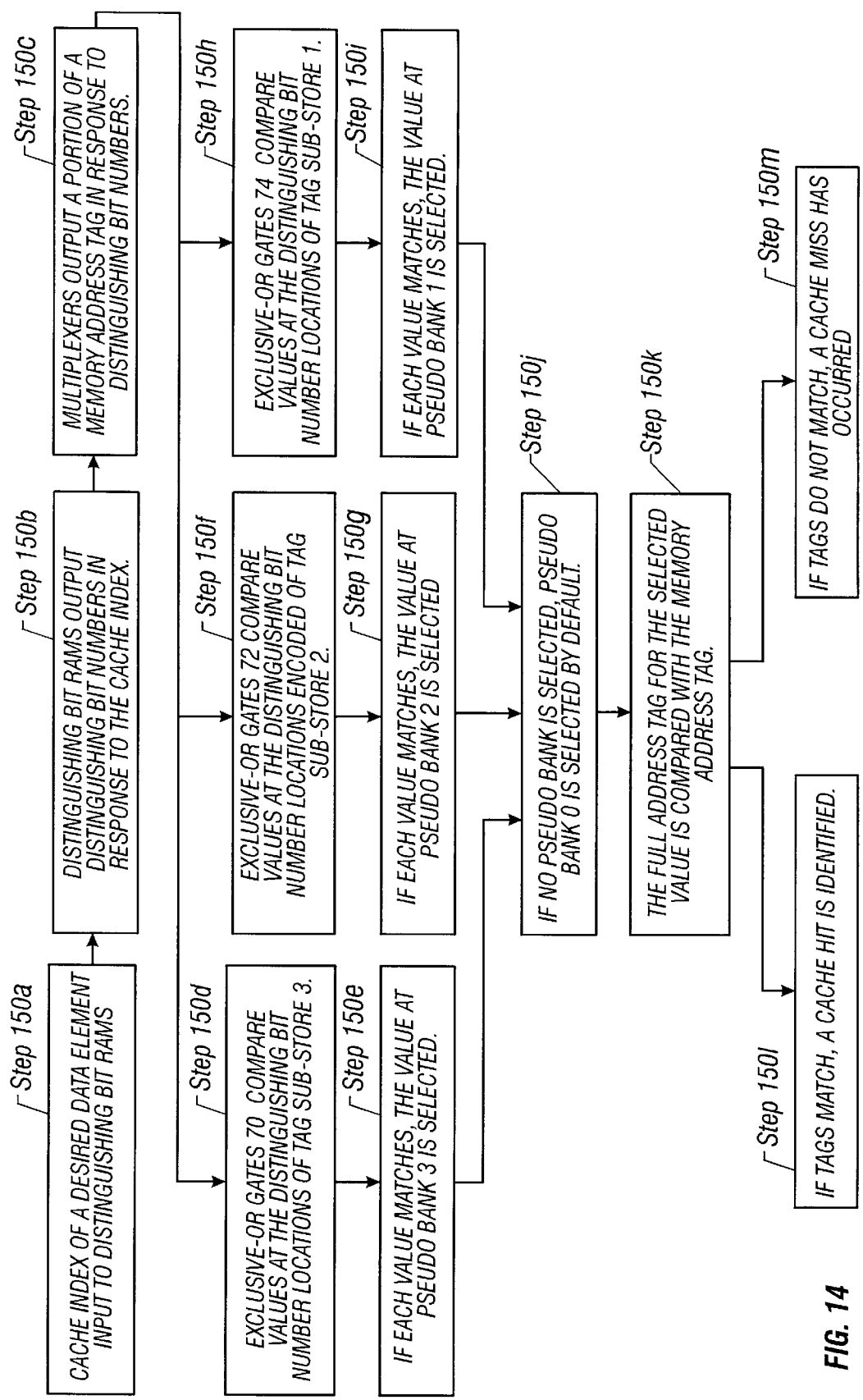
FIG. 14 depicts a flow diagram of the operation of the prediction logic of FIG. 11.

11. Operation of an embodiment having a plurality of tag sub-stores and encoding logic Now that it has been shown how the distinguishing bit RAMs 64 are loaded, an access of secondary cache 22 utilizing distinguishing bit RAMs 64 will be described with respect to the flow diagram of FIG. 14 and the embodiment of FIG. 11. In order to access secondary cache 22, a cache index on line 23b is input to Distinguishing bit RAMs 64', 64'', and 64''' (step 150a). Each of the distinguishing bit RAMs then provide the distinguishing bit numbers on lines 82, 84 and 86 which are coupled to the control input of the associated multiplexer (step 150b). Placing the distinguishing bit numbers on lines 82, 84, and 86 selects the corresponding bit of encoded memory address tag 23a via multiplexers 66', 66'', and 66''' (step 150c).

As previously described, the output of each multiplexer 66', 66'', 66''' is coupled to three levels of exclusive-or gates 70, 72, and 74. Also coupled to the three levels of exclusive-or gates 70, 72, and 74 are the selected values of each tag sub-store that were loaded into the distinguishing bit RAMs 64. Each level of exclusive-or gates compares the selected distinguishing bit values with the selected bit value of the encoded memory address tag.

Continuing the illustration from above the following table summarizes the contents of each selected DBR location:

| | |
|---|---|
| DBR 64''': distinguishing bit number = 0000 | |
| $C_0 = 1$ | (Bit 0 of tag sub-store 3) |
| $C_1 = 1$ | (Bit 0 of tag sub-store 2) |
| $C_2 = 1$ | (Bit 0 of tag sub-store 1) |
| DBR 64'': distinguishing bit number = 0010 | |
| $B_0 = 1$ | (Bit 2 of tag sub-store 3) |
| $B_1 = 0$ | (Bit 2 of tag sub-store 2) |
| $B_2 = 1$ | (Bit 2 of tag sub-store 1) |
| DBR 64': distinguishing bit number = 1000 | |
| $A_0 = 1$ | (Bit 1 of tag sub-store 3) |
| $A_1 = 0$ | (Bit 1 of tag sub-store 2) |
| $A_2 = 0$ | (Bit 1 of tag sub-store 1) |

The first level of exclusive-nor gates 70 compares the three values at the distinguishing bit number locations of encoded tag sub-store 3 (i.e. bits 0, 2, and 1 of encoded tag sub-store 3), with the corresponding values of the distinguishing bit number location of encoded memory address tag 23c (step 150d). If each value matches, then the output of And gate 76' will assert and select secondary cache pseudo bank 3 (step 150e). Likewise, the second level of exclusive-nor gates 72 compares the three values at the distinguishing bit number locations of encoded tag sub-store 2, with the corresponding values at the distinguishing bit number locations of encoded memory address tag 23c (step 150f). If each value matches, then the output of And gate 76" will assert and select tag sub-store 2 (step 150g). Lastly, the third level of exclusive-nor gates 74 compares the three values at the distinguishing bit numbers of encoded tag sub-store 1, with the corresponding values at the distinguishing bit numbers of encoded memory address tag 23c (step 150h). If the values each match, then the output of And gate 76''' will assert and select tag sub-store 1 (step 150i). Also, if none of these combinations selects a tag sub-store, the default logic selects tag sub-store 0 (step 150j). Because of the nature of the distinguishing bit numbers, only one tag sub-store will be selected.

When one of the tag sub-store's is selected, its value is compared with the full value of memory address tag 23a (step 150k). If the two values match, then there is a cache hit, and the data is provided to the CPU (step 150l). Otherwise, if the two values are different, then there is a cache miss and the data must be retrieved from memory (step 150m).

Continuing with the above example, assume that the address sent to the cache memory subsystem from the CPU is hexadecimal EB21. Accordingly, the eight bit memory address tag 23a has a binary value of 1110 1011. The encoded memory address tag 23c (the output of first logic block 90), has a binary value of 110. When the cache index on line 23b is presented to the distinguishing bit RAMs, distinguishing bit numbers 0, 2, and 1 are output on lines 82, 84, and 86. Further, the values of the encoded tag sub-stores at each of the distinguishing bit numbers are output on lines $A_0$–$A_2$, $B_0$–$B_2$, and $C_0$–$C_2$. Therefore, since lines 82, 84, 86 are coupled to the selection inputs of multiplexers 66', 66'', 6''', the values of bits 0, 2, and 1 of encoded memory address tag 23c are output by multiplexers 66', 66'', and 66''' respectively.

The first level of exclusive-nor gates 70 then compares bits 0, 2, and 1 of encoded memory address tag 23c (having values 0,1,1 respectively) with the corresponding bits of encoded tag sub-store 3 denoted $C_0$, $B_0$, $A_0$ (having values 1,1,1 respectively).

Since these values are not equivalent, the output of And gate 76' is not asserted and pseudo bank 3 is not selected. Likewise, the second level of exclusive-nor gates 72 then compares bits 0, 2, and 1 of encoded memory address tag 23c (having values 0,1,1 respectively) with the corresponding bits of encoded tag sub-store 2 denoted $C_1$, $B_1$, $A_1$ (having values 1,0,0 respectively). Since these values are not equivalent, the output of And gate 76''' is not asserted and pseudo bank 2 is not selected. Lastly, the third level of exclusive-nor gates 74 compares bits 0, 2, and 1 of encoded memory address tag 23c (having values 0,1,1 respectively) with the corresponding bits of encoded tag sub-store 1 denoted $C_2$, $B_2$, $A_2$ (having values 1,1,0 respectively). Since these values are not equivalent, the output of And gate 76''' is not asserted and pseudo bank 0 is selected by default. Accordingly, the full value of tag sub-store 0, i.e. binary value 00100001, is compared with the corresponding portion of memory address tag 23a, binary value 00100001. Since these values are also equivalent, a cache hit has occurred. Therefore, cache hit signal 100 will be asserted and the data stored in the corresponding location of pseudo bank 1 of secondary cache 22 will be provided to the attached CPU.

Figure 15:
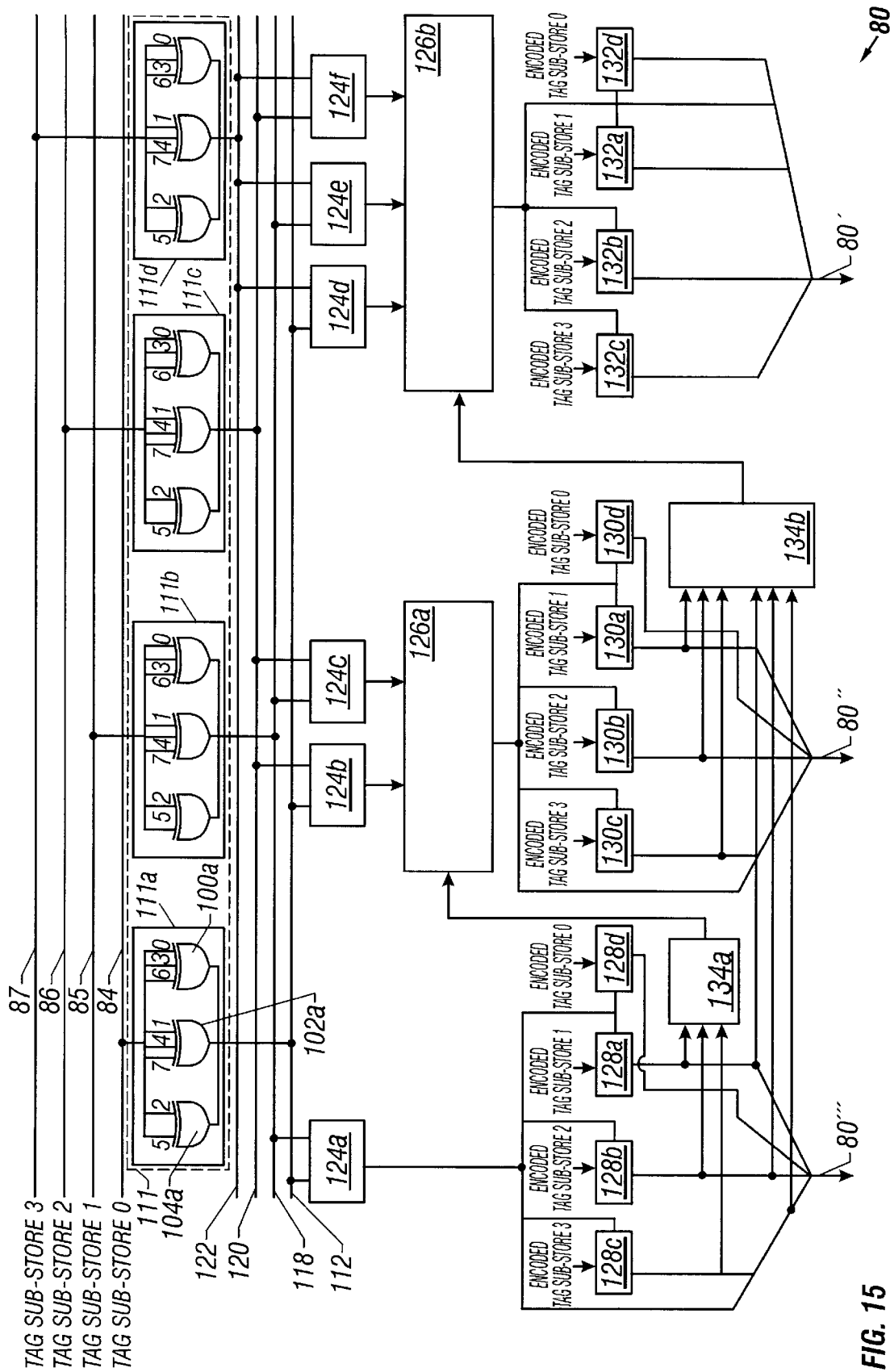
FIG. 15 depicts a further embodiment of the bit number select logic of FIG. 11.

Referring to FIG. 15, a further embodiment of Bit number select logic 80 is shown to include another set of multiplexers 128d, 130d, and 132d. Accordingly, the data inputs of multiplexers 128d, 130d, and 132d are each coupled to the value of encoded tag sub-store 0. The output of comparison logic block 124a is input to the control input of multiplexer 128d in order to select the value of the distinguishing bit location of encoded tag sub-store 0. The output of multiplexer 128d, along with the output of comparison logic block 124a, is coupled to distinguishing bit RAM 64''' via bus 82''', and is stored therein. Likewise, the output of selection logic blocks 126a and 126b are input to the control inputs of multiplexers 130d and 132d respectively to select the value of the associated distinguishing bit locations of encoded tag sub-store 0. The output of multiplexers 130d and 132d, along with the output of selection logic blocks 126a and 126b, are respectively coupled to distinguishing bit RAMs 64'' and 64' via busses 82'' and 82'. Such an embodiment would also include an extra set of exclusive-or gates for comparing the encoded value of tag sub-store 0 at the distinguishing bit number locations, with the corresponding bit number locations of encoded memory address tag 23a.

Having described a preferred embodiment of the invention, it will now become apparent to one of skill in the art that other embodiments incorporating its concepts may be used. Therefore, the scope of the invention should not be limited to the disclosed embodiment, but rather should be limited only by the spirit and scope of the appended claims.

What is claimed is:

1. A method for selecting one of a plurality of banks of a cache memory that contains a requested data element, the method including the steps of:

encoding a segment of a main memory address associated with the requested data element to form a first address associated with the requested data element;

comparing a portion of the first address of the requested data element against a corresponding portion of a plurality of tag addresses, each tag address being associated with a data element stored in the cache memory and the corresponding portions corresponding to differences between the plurality of tag addresses; and selecting the one of the plurality of banks corresponding to one of the plurality of tag addresses having one or more portions equivalent to the one or more portions of the first address associated with the requested data element.

2. The method of claim 1 further including the step of:

encoding the plurality of tag addresses, each associated with the data element stored in the cache memory, to form a plurality of encoded tag addresses.

3. The method of claim 2 further including the step of:

calculating the differences between the plurality of tag addresses associated with the data elements stored in the cache memory, by performing an exclusive-or function for each pair of the tag addresses.

4. The method of claim 3 further including the steps of:

determining a first one of the portions of the plurality of tag addresses corresponding to the result of a first one of the differences; and determining subsequent ones of the portions of the plurality of tag addresses that do not correspond with previously determined portions of the plurality of tag addresses.

5. A method for determining a location of a requested data element in a cache memory including the steps of:

encoding a plurality of selected values each stored in a different one of a plurality of tag address sub-stores, each of the tag address sub-stores corresponding to one of a plurality of banks of the cache memory, the encoding step yielding a plurality of encoded selected values;

calculating one or more bit number locations of differences between each of the plurality of encoded selected values, each of the bit number locations being unique;

storing the one or more bit number locations in storage locations of a distinguishing bit RAM, the storage locations being addressable by an index portion of an address associated with the selected values stored in the plurality of tag address sub-stores;

storing a portion of each of the plurality of encoded selected values, in the corresponding storage locations of the plurality of distinguishing bit RAMs, the portion identified by the one or more bit number locations;

outputting the one or more bit number locations and the portions of the encoded selected values, from the distinguishing bit RAM in response to a cache index having a value equivalent to the index portion of the address associated with the selected values stored in the plurality of tag address sub-stores, the cache index being a portion of an address of a requested data element;

encoding a tag portion of the address of the requested data element, in a manner that is functionally equivalent to a manner used in the first encoding step to encode the plurality of selected values stored in the tag address sub-store;

selecting one or more sections of the encoded tag portion of the address of the requested data element that correspond to the bit number location output from the distinguishing bit RAM; and comparing each of the one or more selected sections of the tag portion of the address with a corresponding section of the plurality of tag address sub-stores and, upon determining an equivalency, selecting a corresponding bank of the cache memory.

6. The method of claim 5 further including the step of determining when a new data element is stored in one of the plurality of banks of the cache memory and performing the calculating step in response to the determining step.

7. The method of claim 5, wherein the first encoding step includes the step of performing a plurality of exclusive-or functions on the plurality of selected values.

8. The method of claim 5 wherein the second encoding step includes the step of performing a plurality of exclusive-or functions on the tag portion of the address.

9. A cache memory apparatus including a reduced size distinguishing bit RAM, comprising:

a first memory having a plurality of locations for storing data, the first memory partitioned into a plurality of banks, each of the banks being addressable by a first index, the first index comprised of an index portion of a main memory address and a determination value;

a bank determination logic including circuits for outputting the determination value in response to the index portion of the main memory address and in response to an encoded tag portion of the main memory address output from a first encoding logic coupled to the determination logic;

a tag store, coupled to the determination logic to receive the first index and coupled to a tag portion of the main memory address, the tag store including a plurality of sub-stores corresponding to the plurality of banks of the first memory, each of the sub-stores having a plurality of locations related to the plurality of locations in the corresponding banks of the first memory;

a bit number select logic for determining a difference value as between each value in the plurality of locations of the plurality of sub-stores such that the difference is determined between each of a first selected value in one of the plurality of locations of the plurality of sub-stores and a second value in a corresponding one of the plurality of locations of another of the plurality of sub-stores;

a second encoding logic included in the bit number select logic for encoding the difference value, the second encoding logic encoding the difference value in a manner that is functionally equivalent to the first encoding logic.

10. The cache memory apparatus of claim 9 wherein the determination logic further comprises:

a distinguishing bit RAM including a plurality of locations corresponding to the plurality of locations of the sub-stores wherein each location of the distinguishing bit RAM stores a bit number corresponding to the encoded difference value and a complement value, the bit number and the complement value being received from the bit number select logic, the distinguishing bit RAM including an output on which the bit number and the complement value is output in response to the index portion of the main memory address;

a selection logic for selecting a portion of the encoded tag portion of the main memory address, responsive to the bit number;

a combining logic, coupled to the selection logic and to the distinguishing bit RAM output, for combining the selected portion of the encoded tag portion of the main memory address with the complement value to form the determination value.

11. The cache memory apparatus of claim 10 wherein the combining logic outputs an inverted representation of the selected portion of the encoded tag portion of the main memory address when the complement value is a first preselected value and the combining logic outputs an equivalent representation of the portion of the encoded tag portion of the main memory address when the complement value is a second preselected value.

12. The cache memory apparatus of claim 11 wherein the first encoding logic includes:

a first plurality of exclusive-or gates, each of the first plurality of exclusive-or gates receiving as input a different portion of the tag portion of the main memory address and a collection of outputs of the first plurality of exclusive-or gates comprises the encoded tag portion of the main memory address.

13. The cache memory apparatus of claim 12 wherein an output of each of the first plurality of exclusive-or gates is coupled to a different one of a plurality of input ports of the selection logic.

14. The cache memory apparatus of claim 13 wherein the second encoding logic, includes:

a second plurality of exclusive-or gates, each of the second plurality of exclusive-or gates receiving as input a different portion of the difference value, the second plurality of exclusive-or gates including functionality equivalent to the first plurality of exclusive-or gates, a collection of outputs of the second plurality of exclusive-or gates comprises the encoded difference.

15. The cache memory apparatus of claim 15 wherein an output of each of the second plurality of exclusive-or gates is coupled to a different one of a plurality of input ports of the distinguishing bit RAM.

16. The cache memory apparatus of claim 9 wherein the second encoding logic encoding the difference value in a manner that is functionally equivalent to the first encoding logic means that the first encoding logic and the second encoding logic output a same output value in response to a same input value although each of the first and second encoding logics comprise different circuit configurations.

17. The cache memory apparatus of claim 10 wherein the first encoding logic comprises:

a plurality of exclusive-or gates corresponding to a number of inputs of the selection logic, each having a plurality of input terminals coupled to a different portion of the tag portion of the main memory address, each of the plurality exclusive-or gates having an output coupled to a different one of the inputs of the selection logic.

18. The cache memory apparatus of claim 17 wherein the second encoding logic comprises:

a plurality of exclusive-or gates corresponding to the number of inputs of the selection logic, each having a plurality of input terminals coupled to a different portion of the difference value, each of the plurality exclusive-or gates having an output coupled to a different one of the inputs of the distinguishing bit RAM.

19. The cache memory apparatus of claim 10 wherein the first encoding logic is defined by the following equation:

For (n = 0; n = desired number of inputs to the selection logic; n++)

{

Exclusive-Or Output $n =$ $$\sum_{b=0}^{\text{desired number of inputs to the selection logic} - 1} \text{Memory Address tag bit}\,(n + (b \times \text{number of inputs to the selection logic}))$$

}

20. A cache apparatus, comprising:

a first memory having a plurality of locations for storing data, the first memory partitioned into a plurality of banks each of the banks being addressable by a predetermined one of a first plurality of indexes, each of the first plurality s of indexes comprised of an index portion of a main memory address and one of a plurality of determination values;

a bank determination logic including circuits for outputting the plurality of determination values in response to the index portion of the main memory address and in response to a tag portion of the main memory address, the bank determination logic including:

a pluralit of distinguishing bit RAMs each including a plurality of locations corresponding to the plurality of locations of a corresponding one of the substores wherein each location of each of the distinguishing bit RAMs stores one of the distinguishing bit numbers and one of a plurality of complement values each of the plurality of distinguishing bit RAMs including an output for outputting the distinguishing bit numbers and one of the complement values in response to a corresponding value of the index portion of the main memory address:

a plurality of selection logics, each having a control input coupled to a corresponding one of the outputs of the plurality of distinguishing bit RAMs and each having a data input coupled to the tag portion of the main memory address, each selection logic for selecting a portion of the tag portion of the main memory address responsive to the output of the corresponding distinguishing bit RAM;

a plurality of comparison logics, each coupled to a different one of the plurality of selection logics and to a different portion of the distinguishing bit RAM outputs for comparing the portion of the tag portion of the main memory address with the complement value to form the plurality of determination values;

a tag store, coupled to the bank determination logic for receiving the first plurality of indexes and coupled to a tag portion of the main memory address, the tag store including a plurality of sub-stores each corresponding to one of the plurality of banks of the first memory, each of the sub-stores having a plurality of locations related to the plurality of locations in the corresponding bank of the first memory;

a bit number select logic for determining a difference value between each value in each one of the plurality of locations of the plurality of sub-stores and each value in a corresponding one of the plurality of locations of another of the plurality of sub-stores, the bit number select logic further including a distinguishing bit selection logic for outputting a unique distinguishing bit number for each difference value determined.

* * * * *